US007986501B2

(12) United States Patent
Kamor et al.

(10) Patent No.: US 7,986,501 B2

(45) Date of Patent: Jul. 26, 2011

(54) DETECTING AND SENSING ACTUATION IN A CIRCUIT INTERRUPTING DEVICE

(75) Inventors: Michael Kamor, North Massapequa, NY (US); Mario Angelides, Oceanside, NY (US); Benjamin Mehdi Moadel, New York, NY (US); Gaetano Bonasia, Bronx, NY (US); Ross Mernyk, Brooklyn, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 247 days.

(21) Appl. No.: 12/398,550

(22) Filed: Mar. 5, 2009

(65) Prior Publication Data

US 2010/0226053 A1 Sep. 9, 2010

(51) Int. Cl.
*H02H 3/00* (2006.01)

(52) U.S. Cl. ........................................................ 361/42

(58) Field of Classification Search ..................... 361/42
See application file for complete search history.

(56) References Cited

U.S. PATENT DOCUMENTS

| | | | | |
|---|---|---|---|---|
| 4,356,526 | A * | 10/1982 | Russell | 361/59 |
| 4,455,654 | A | 6/1984 | Bhaskar et al. | |
| 4,595,894 | A | 6/1986 | Doyle et al. | |
| 5,136,458 | A | 8/1992 | Durivage, III | |
| 5,270,900 | A | 12/1993 | Alden et al. | |
| 5,309,310 | A | 5/1994 | Baer et al. | |
| 5,386,183 | A | 1/1995 | Cronvich et al. | |
| 5,475,609 | A | 12/1995 | Apothaker | |
| 5,541,800 | A * | 7/1996 | Misencik | 361/45 |
| 5,600,524 | A | 2/1997 | Neiger et al. | |
| 5,715,125 | A | 2/1998 | Neiger et al. | |
| 5,956,218 | A | 9/1999 | Berthold | |
| 5,978,191 | A | 11/1999 | Bonniau et al. | |
| 6,040,967 | A | 3/2000 | DiSalvo | |
| 6,052,265 | A | 4/2000 | Zaretsky et al. | |
| 6,052,266 | A | 4/2000 | Aromin | |
| 6,111,733 | A | 8/2000 | Neiger et al. | |
| 6,169,405 | B1 | 1/2001 | Baltzer et al. | |
| 6,191,589 | B1 | 2/2001 | Clunn | |
| 6,253,121 | B1 | 6/2001 | Cline et al. | |
| 6,282,070 | B1 | 8/2001 | Ziegler et al. | |
| 6,426,632 | B1 | 7/2002 | Clunn | |
| 6,426,634 | B1 | 7/2002 | Clunn et al. | |

(Continued)

FOREIGN PATENT DOCUMENTS

WO WO 00/14842 3/2000

*Primary Examiner* — Stephen W Jackson

(74) *Attorney, Agent, or Firm* — Carter, DeLuca, Farrell & Schmidt, LLP

(57) ABSTRACT

A circuit interrupting device configured to cause electrical discontinuity along a conductive path upon the occurrence of a predetermined condition is disclosed. The device includes a fault sensing circuit detecting the predetermined condition and generating a circuit interrupting actuation signal, and a coil and plunger assembly actuatable by the circuit interrupting actuation signal so that, upon detecting the predetermined condition, the plunger will move in a fault direction from a non-actuated to an actuated configuration a distance sufficient to cause disengagement of at least one set of contacts from each other to cause electrical discontinuity along the conductive path; and a test assembly causing the plunger to move in a test direction, from a pre-test configuration to a post-test configuration, a distance insufficient to disengage the at least one set of contacts from each other. Analogous methods of testing the circuit interrupting device are also disclosed.

65 Claims, 14 Drawing Sheets

U.S. PATENT DOCUMENTS

| | | | |
|---|---|---|---|
| 6,437,700 | B1 | 8/2002 | Herzfeld et al. |
| 6,577,133 | B1 * | 6/2003 | Barron .......................... 324/415 |
| 6,807,035 | B1 | 10/2004 | Baldwin et al. |
| 6,807,036 | B2 | 10/2004 | Baldwin |
| 6,980,005 | B2 | 12/2005 | Finlay, Sr. et al. |
| 7,149,065 | B2 | 12/2006 | Baldwin et al. |
| 7,177,129 | B2 | 2/2007 | Arenz et al. |
| 7,268,559 | B1 | 9/2007 | Chen et al. |
| 2002/0078511 | A1 | 6/2002 | Blair et al. |
| 2004/0223272 | A1 | 11/2004 | Germain et al. |
| 2004/0252425 | A1 | 12/2004 | Baldwin et al. |
| 2005/0036250 | A1 | 2/2005 | Asano |
| 2005/0063109 | A1 | 3/2005 | Baldwin et al. |
| 2006/0125622 | A1 | 6/2006 | Baldwin et al. |
| 2007/0091520 | A1 | 4/2007 | Angelides et al. |
| 2007/0165342 | A1 | 7/2007 | Elms |
| 2007/0279814 | A1 | 12/2007 | Bonilla et al. |
| 2008/0002313 | A1 | 1/2008 | DiSalvo et al. |
| 2009/0040667 | A1 | 2/2009 | DiSalvo et al. |
| 2009/0086389 | A1 | 4/2009 | Huang et al. |
| 2009/0086390 | A1 | 4/2009 | Huang |
| 2009/0161271 | A1 | 6/2009 | Huang et al. |
| 2010/0013491 | A1 | 1/2010 | Hooper et al. |

* cited by examiner

DETECTING AND SENSING ACTUATION IN A CIRCUIT INTERRUPTING DEVICE

BACKGROUND

1. Field

The present disclosure relates to circuit interrupting devices. In particular, the present disclosure is directed to re-settable circuit interrupting devices and systems that comprises ground fault circuit interrupting devices (GFCI devices), arc fault circuit interrupting devices (AFCI devices), immersion detection circuit interrupting devices (IDCI devices), appliance leakage circuit interrupting devices (ALCI devices), equipment leakage circuit interrupting devices (ELCI devices), circuit breakers, contactors, latching relays and solenoid mechanisms. More particularly, the present disclosure is directed to circuit interrupting devices that include a circuit interrupter that can break electrically conductive paths between a line side and a load side of the devices.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with circuit interrupting devices, such as ground fault circuit interrupting devices (GFCI), for example.

In particular, GFCI devices protect electrical circuits from deleterious effects that may occur when electrical current being supplied to an operating electrical appliance, light fixture, power tool or other similar electrical device is being short to ground. When the short to ground occurs through a human being, electrocution occurs. To prevent continued operation of the particular electrical device under such conditions, a GFCI device monitors the difference in current flowing into and out of the electrical device. A load-side terminal connects to the hot wire and provides electricity to the electrical device.

A differential transformer may measure the difference in the amount of current flow through the hot and neutral wires. Via a current signal analyzer, when the difference in current exceeds a predetermined level, e.g., 5 milliamps, indicating that a ground fault may be occurring, the GFCI device interrupts or terminates the current flow within a particular time period, e.g., 25 milliseconds or greater. The current may be interrupted via a solenoid coil that mechanically opens switch contacts to shut down the flow of electricity. A GFCI device includes a reset button that allows a user to reset or close the switch contacts to resume current flow to the electrical device. A GFCI device may also include a user-activated test button that allows the user to activate or trip the solenoid to open the switch contacts to verify proper operation of the GFCI device.

A more detailed description of a GFCI device is provided in U.S. Pat. No. 4,595,894, which is incorporated herein in its entirety by reference. Presently available GFCI devices, such as the device described in commonly owned U.S. Pat. No. 4,595,894 (the '894 patent), use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

In addition, intelligent ground fault circuit interrupting (IGFCI) devices are known in the art that can automatically test internal circuitry on a periodic basis, thereby boosting probability of proper operation in the event of a real ground fault. Such GFCI devices can perform self-testing on a monthly, weekly, daily or even hourly basis. In particular, all key components can be tested except for the relay contacts. This is because tripping the contacts for testing has the undesirable result of removing power to the user's circuit. However, once a month, for example, such GFCI devices can generate a visual and/or audible signal or alarm reminding the user to manually test the GFCI device. The user, in response to the signal, initiates a test by pushing a test button, thereby testing the operation of the contacts in addition to the rest of the GFCI circuitry. Following a successful test, the user can reset the GFCI device by pushing a reset button.

Examples of such intelligent ground fault circuit interrupter devices can be found in U.S. Pat. No. 5,600,524, U.S. Pat. No. 5,715,125, and U.S. Pat. No. 6,111,733 each by Nieger et al. and each entitled "INTELLIGENT GROUND FAULT CIRCUIT INTERRUPTER," and each of which is incorporated herein by reference in its entirety. Additionally, another example of an intelligent ground fault current interrupter device can be found in U.S. Pat. No. 6,052,265 by Zaretsky et al., entitled "INTELLIGENT GROUND FAULT CIRCUIT INTERRUPTER EMPLOYING MISWIRING DETECTION AND USER TESTING," which is incorporated herein by reference in its entirety.

SUMMARY

The present disclosure is directed to detecting and sensing solenoid plunger movement in a current interrupting device. In particular, the present disclosure relates to a circuit interrupting device configured to cause electrical discontinuity along a conductive path upon the occurrence of a predetermined condition, that includes a fault sensing circuit configured to detect the predetermined condition and to generate a circuit interrupting actuation signal, and a coil and plunger assembly, having at least one coil and a plunger actuatable by the circuit interrupting actuation signal. The plunger is configured and disposed within the circuit interrupting device so that upon detection of the occurrence of the predetermined condition the plunger will move in a fault direction from a non-actuated configuration to an actuated configuration a distance sufficient to cause disengagement of at least one set of contacts from each other and thereby cause electrical discontinuity along the conductive path. The circuit interrupting device also includes a test assembly that is configured to cause the plunger to move in a test direction, from a pre-test configuration to a post-test configuration, a distance insufficient to disengage the at least one set of contacts from each other.

The present disclosure relates also to a method of testing a circuit interrupting device that includes the steps of: generating an actuation signal; causing a plunger to move in response to the actuation signal, without causing the circuit interrupting device to trip; measuring the movement of the plunger; and determining whether the movement reflects an operable circuit interrupting device.

DETAILED DESCRIPTION

The present disclosure relates to a current interrupting device configured to perform an automatic self-test sequence on a periodic basis (e.g.,—every few cycles of alternating current (AC), hourly, daily, weekly, monthly, or other suitable time period) without the need for user intervention and, in addition, wherein the current interrupting device includes members configured to enable the self-test sequence or procedure to test the operability and functionality of the device's components up to and including the movement of the solenoid plunger.

The description herein is described with reference to a ground fault circuit interrupting (GFCI) device for exemplary purposes. However, aspects of the present disclosure are applicable to other types of circuit interrupting devices, such as arc fault circuit interrupting devices (AFCI devices), immersion detection circuit interrupting devices (IDCI devices), appliance leakage circuit interrupting devices (ALCI devices), equipment leakage circuit interrupting devices (ELCI devices), circuit breakers, contactors, latching relays and solenoid mechanisms.

As defined herein, the terms forward, front, etc. refers to the direction in which the standard plunger moves in order to trip the GFCI. Terms such as front, forward, rear, back, backward, top, bottom, side, lateral, transverse, upper, lower and similar terms are used solely for convenience of description and the embodiments of the present disclosure are not limited thereto.

Figure 1:
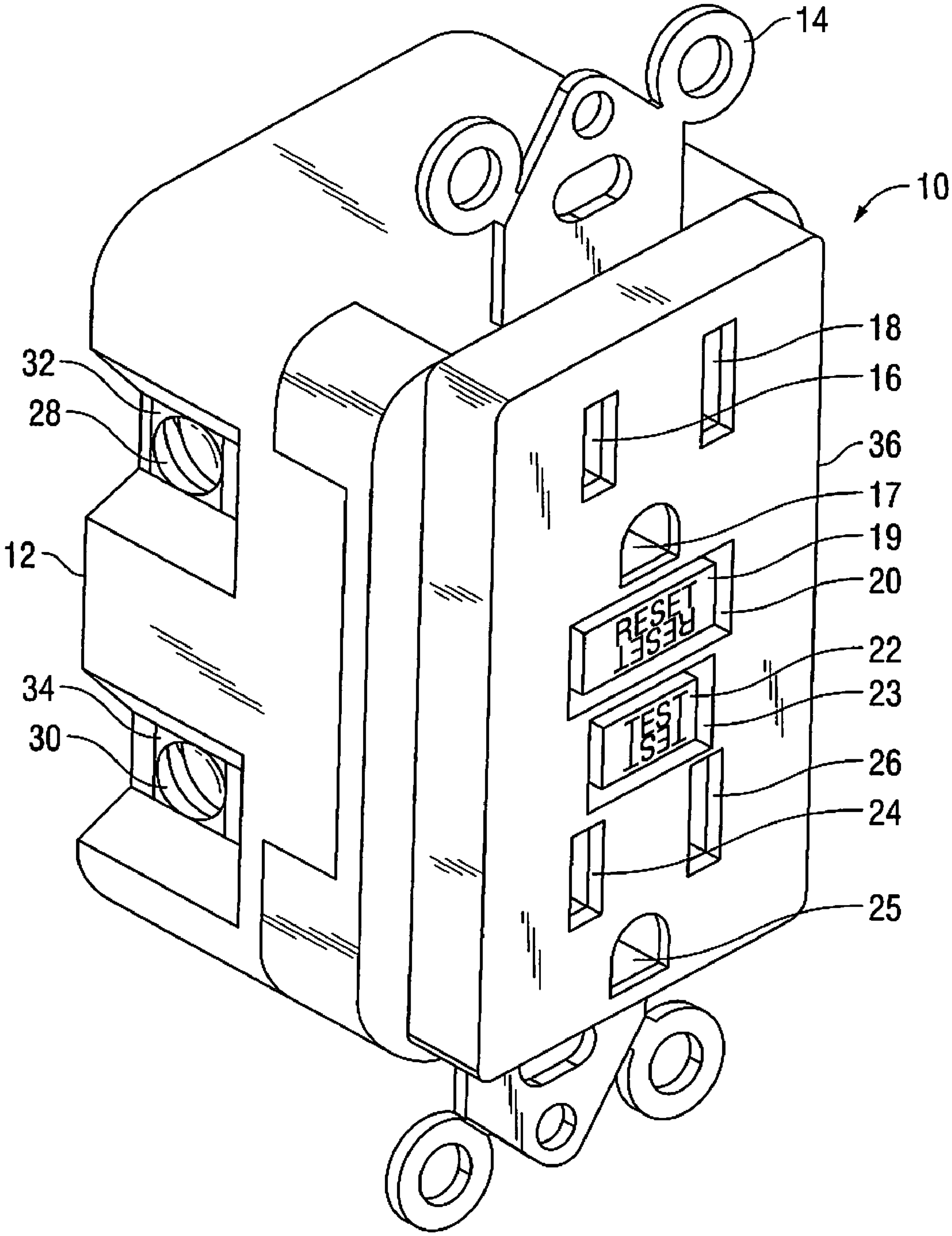
FIG. 1 is a perspective view of one embodiment of a ground fault circuit interrupting (GFCI) device that includes a solenoid coil and plunger assembly and that can be configured to incorporate the self-testing features up to and including movement of the plunger of the solenoid coil and plunger assembly according to the present disclosure.

Turning now to FIG. 1, an exemplary GFCI device 10, which may be configured to perform an automatic self-test sequence on a periodic basis as described above without the need for user intervention. The self-test sequence tests the operability and functionality of the GFCI components up to and including the movement of the solenoid according to the present disclosure. GFCI device 10 has a housing 12 to which a face or cover portion 36 is removably secured. The face portion 36 has entry ports 16, 18, 24 and 26 aligned with receptacles for receiving normal or polarized prongs of a male plug of the type normally found at the end of a household device electrical cord (not shown), as well as ground-prong-receiving openings 17 and 25 to accommodate three-wire plugs. The GFCI device 10 also includes a mounting strap 14 used to fasten the device to a junction box.

A detailed description of such a circuit interrupting device can be found in U.S. Patent Application Publication US 2004/0223272 A1, by Germain et al, entitled "CIRCUIT INTERRUPTING DEVICE AND SYSTEM UTILIZING BRIDGE CONTACT MECHANISM AND RESET LOCKOUT," the entire contents of which are incorporated herein by reference.

A test button 22 extends through opening 23 in the face portion 36 of the housing 12. The test button 22 is used when it is desired to manually set the device 10 to a trip condition. The circuit interrupter, to be described in more detail below, breaks electrical continuity in one or more conductive paths between the line and load side of the device. The one or more conductive paths form a power circuit in the GFCI 10. A reset button 20 forming a part of the reset portion extends through opening 19 in the face portion 36 of the housing 12. The reset button 20 is used to activate a reset operation, which reestablishes electrical continuity through the conductive paths.

Still referring to FIG. 1, electrical connections to existing household electrical wiring are made via binding screws 28 and 30 where, for example, screw 30 is an input (or line) phase connection, and screw 28 is an output (or load) phase connection. Screws 28 and 30 are fastened (via a threaded arrangement) to terminals 32 and 34 respectively. However, the GFCI device 10 can be designed so that screw 30 can be an output phase connection and screw 28 an input phase or line connection. Terminals 32 and 34 are one half of terminal pairs. Thus, two additional binding screws and terminals (not shown) are located on the opposite side of the device 10. These additional binding screws provide line and load neutral connections, respectively. It should also be noted that the binding screws and terminals are exemplary of the types of wiring terminals that can be used to provide the electrical connections. Examples of other types of wiring terminals include set screws, pressure clamps, pressure plates, push-in type connections, pigtails and quick-connect tabs. The face terminals are implemented as receptacles configured to mate with male plugs. A detailed depiction of the face terminals is shown in FIG. 2.

Figure 2:
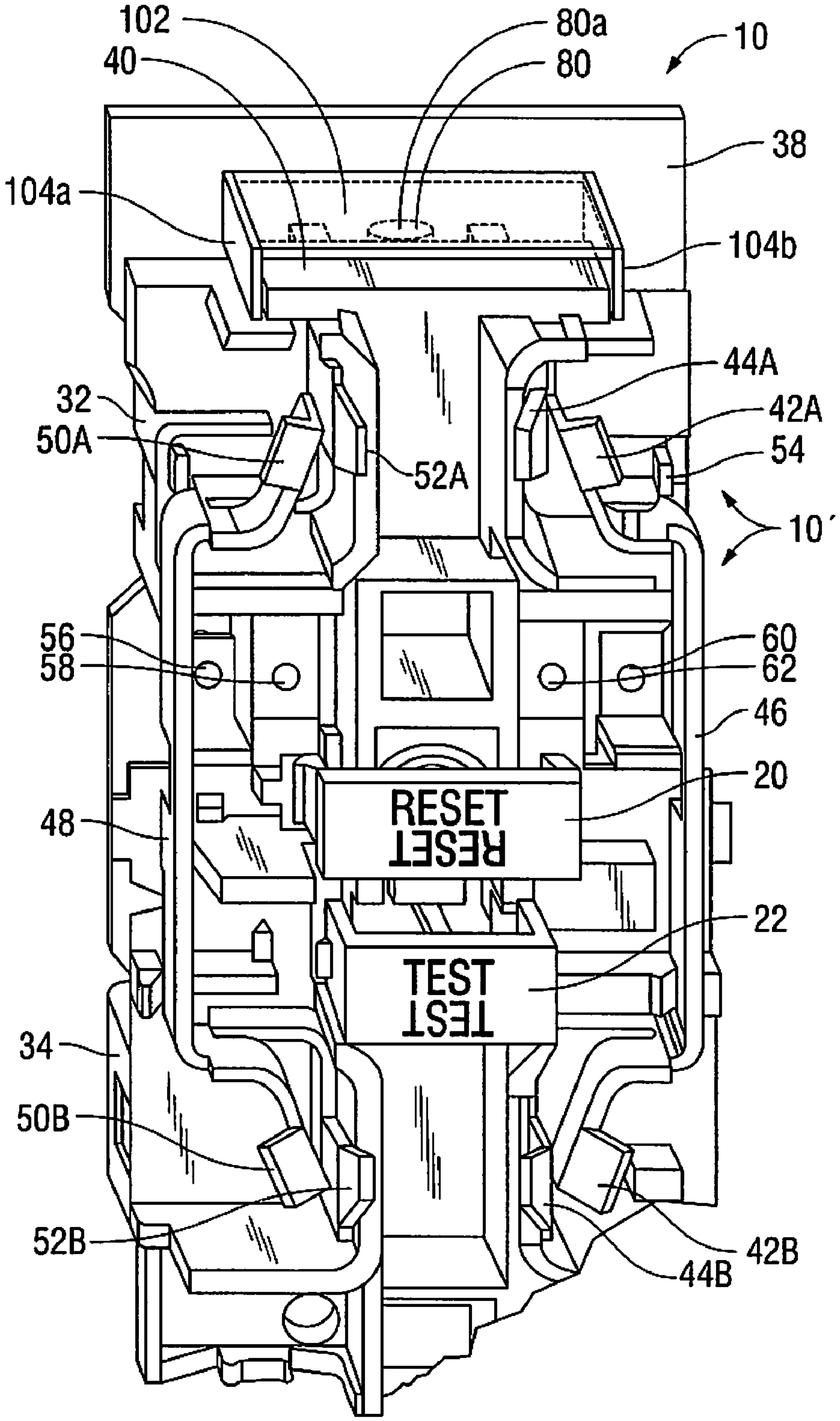
FIG. 2 is a top view of a portion of the GFCI device according to the present disclosure shown in FIG. 1, with the face portion removed.

Referring to FIG. 2, a top view of the GFCI device 10 (without face portion 36 and strap 14) is shown. An internal housing structure 40 provides the platform on which the components of the GFCI device are positioned. Reset button 20 and test button 22 are mounted on housing structure 40. Housing structure 40 is mounted on printed circuit board 38. The receptacle aligned to opening 16 of face portion 36 is made from extensions 50A and 52A of frame 48.

Frame 48 is made from an electricity conducting material from which the receptacles aligned with openings 16 and 24 are formed. The receptacle aligned with opening 24 of face portion 36 is constructed from extensions 50B and 52B of frame 48. Also, frame 48 has a flange the end of which has electricity conducting contact 56 attached thereto. Frame 46 is made from an electricity conducting material from which receptacles aligned with openings 18 and 26 are formed.

Figure 3:
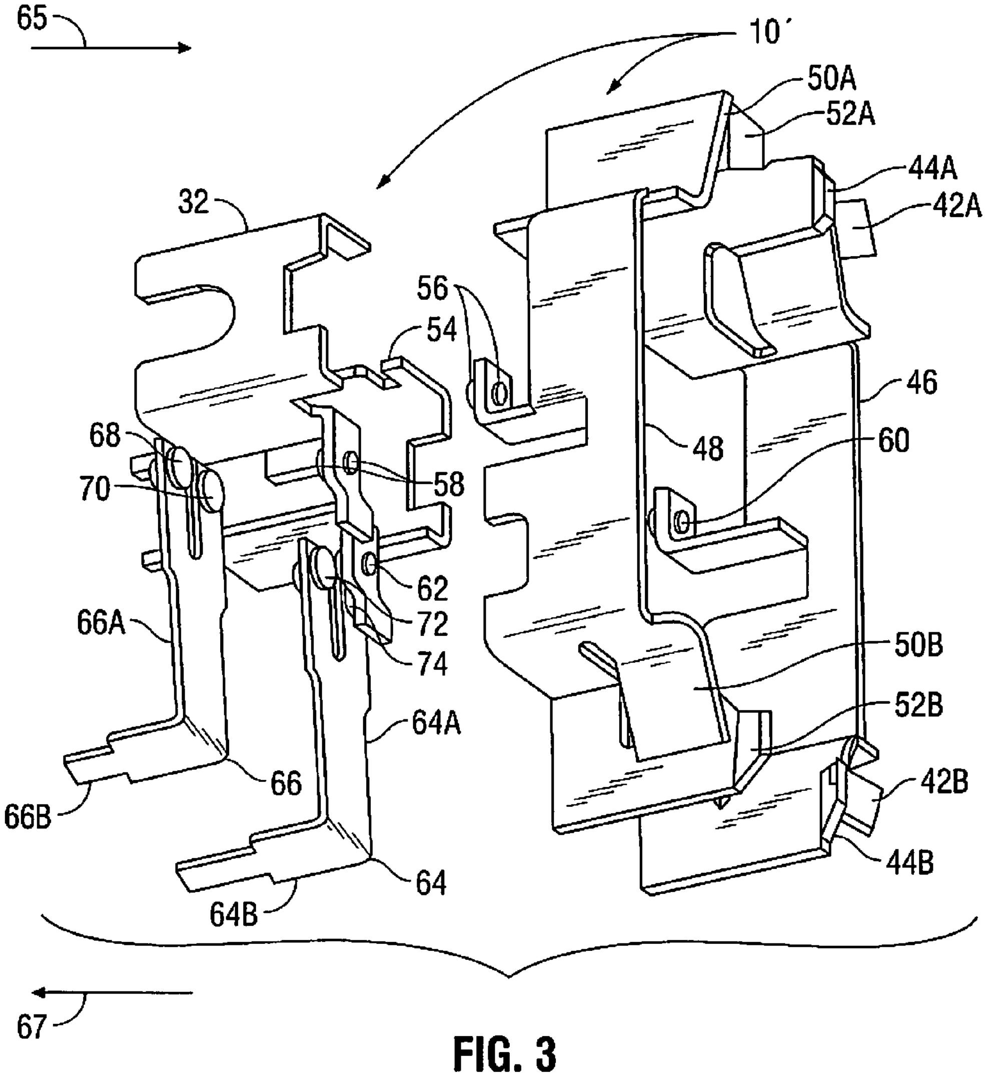
FIG. 3 is an exploded perspective view of the face terminal internal frames, load terminals and movable bridges.

The receptacle aligned with opening 18 of frame portion 36 is constructed with frame extensions 42A and 44A. The receptacle aligned with opening 26 of face portion 36 is constructed with extensions 42B and 44B. Frame 46 has a flange the end of which has electricity conducting contact 60 attached thereto. Therefore, frames 46 and 48 form the face terminals implemented as receptacles aligned to openings 16, 18, 24 and 26 of face portion 36 of GFCI 10 (see FIG. 1). Load terminal 32 and line terminal 34 are also mounted on internal housing structure 40. Load terminal 32 has an extension the end of which electricity conducting load contact 58 is attached. Similarly, load terminal 54 has an extension to which electricity conducting contact 62 is attached. The line, load and face terminals are electrically isolated from each other and are electrically connected to each other by a pair of movable bridges. The relationship between the line, load and face terminals and how they are connected to each other is shown in FIG. 3. Other configurations of line, load and face conductive paths and their points of connectivity, with and without movable bridges are well known and within the scope of this disclosure.

Referring now to FIG. 3, there is shown the positioning of the face and load terminals with respect to each other and their interaction with the movable bridges (64, 66). Although the line terminals are not shown, it is understood that they are electrically connected to one end of the movable bridges. The movable bridges (64, 66) are generally electrical conductors that are configured and positioned to connect at least the line terminals to the load terminals. In particular movable bridge 66 has bent portion 66B and connecting portion 66A. Bent portion 66B is electrically connected to line terminal 34 (not shown).

Similarly, movable bridge 64 has bent portion 64B and connecting portion 64A. Bent portion 64B is electrically connected to the other line terminal (not shown); the other line terminal being located on the side opposite that of line terminal 34. Connecting portion 66A of movable bridge 66 has two fingers each having a bridge contact (68, 70) attached to its end. Connecting portion 64A of movable bridge 64 also has two fingers each of which has a bridge contact (72, 74) attached to its end. The bridge contacts (68, 70, 72 and 74) are made from relatively highly conductive material. Also, face terminal contacts 56 and 60 are made from relatively highly conductive material. Further, the load terminal contacts 58 and 62 are made from relatively highly conductive material. The movable bridges 64, 66 are preferably made from flexible metal that can be bent when subjected to mechanical forces.

The connecting portions (64A, 66A) of the movable bridges 64, 66, respectively, are mechanically biased downward or in the general direction shown by arrow 67. When the GFCI device 10 is reset, the connecting portions of the movable bridges are caused to move in the direction shown by arrow 65 and engage the load and face terminals thus connecting the line, load and face terminals to each other.

In particular connecting portion 66A of movable bridge 66 is bent upward (direction shown by arrow 65) to allow contacts 68 and 70 to engage contacts 56 of frame 48 and contact 58 of load terminal 32 respectively. Similarly, connecting portion 64A of movable bridge 64 is bent upward (direction shown by arrow 65) to allow contacts 72 and 74 to engage contact 62 of load terminal 54 and contact 60 of frame 46 respectively.

Figure 4:
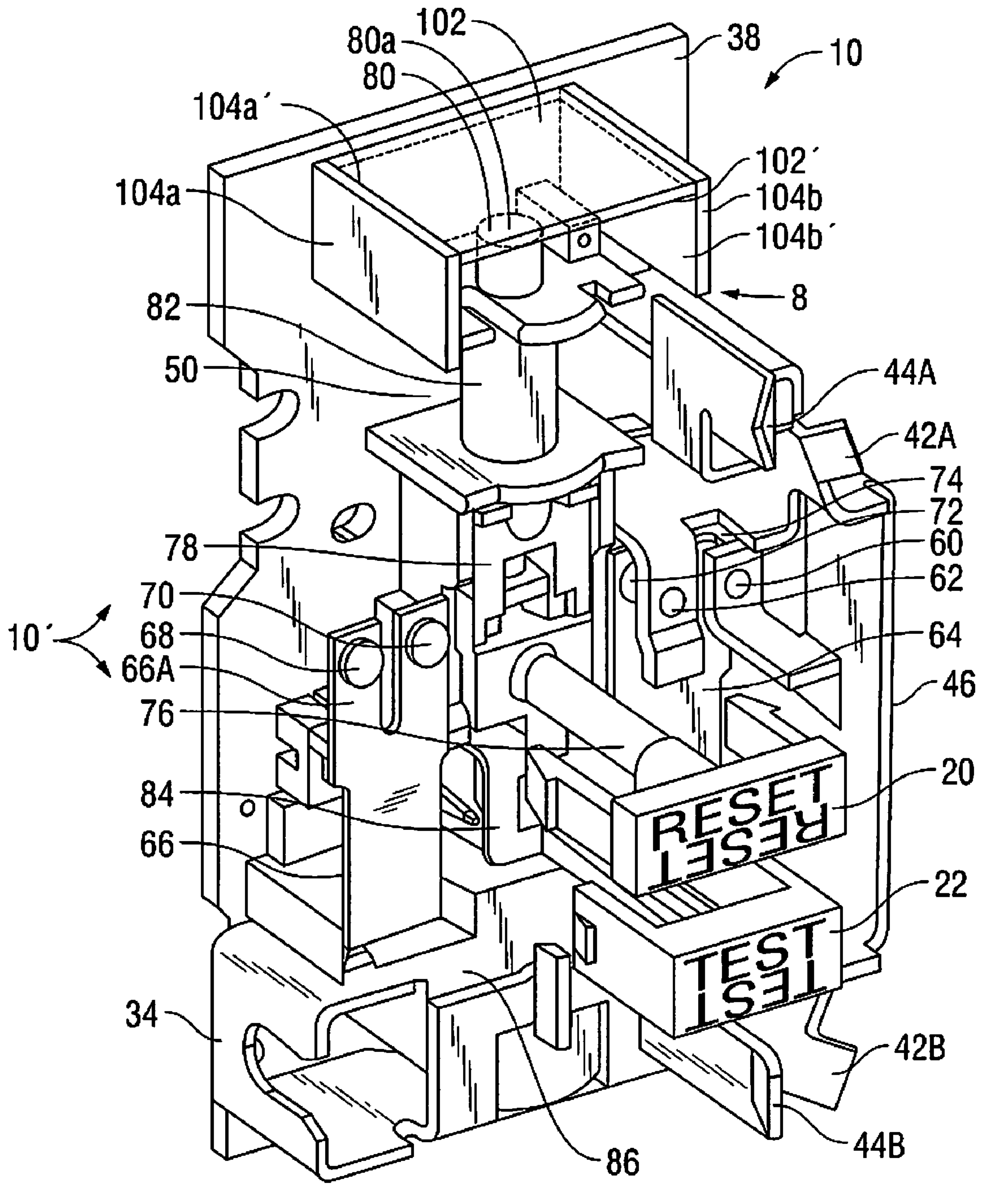
FIG. 4 is a perspective view of the arrangement of some of the components of the circuit interrupter of the device of FIGS. 1-3 that is configured to detect and sense solenoid plunger movement according to the present disclosure.

The connecting portions of the movable bridges are bent upwards by a latch/lifter assembly positioned underneath the connecting portions where this assembly moves in an upward direction (direction shown by arrow 65) when the GFCI device is reset. It should be noted that the contacts of a movable bridge engaging a contact of a load or face terminals occurs when electric current flows between the contacts; this is done by having the contacts touch each other. Some of the components that cause the connecting portions of the movable bridges to move upward are shown in FIG. 4.

Referring again also to FIG. 2, FIGS. 4 and 5 illustrate a partial view of the GFCI device 10 according to the present disclosure that is configured to perform an automatic self-test sequence on a periodic basis that includes movement of a solenoid plunger. More particularly, the GFCI device 10 includes a fault or failure sensing circuit residing in a printed circuit board 38. The fault or failure sensing circuit is not explicitly shown in FIG. 2, 4 or 5 and is incorporated into the layout of the printed circuit board 38. Components for the circuit are electrically coupled to the printed circuit board 38 which receives electrical power from the power being supplied externally to the GFCI device 10. The fault or sensing circuit is configured to detect a predetermined condition and to generate a circuit interrupting actuation signal. FIG. 4 illustrates mounted on printed circuit board 38 a fault circuit interrupting solenoid coil and plunger assembly or combination 8 that includes bobbin 82 having a cavity 50 in which elongated cylindrical plunger 80 is slidably disposed. For clarity of illustration, frame 48 and load terminal 32 are not shown.

One end 80*a* of plunger 80 is shown extending outside of the bobbin cavity 50. The other end of plunger 80 (not shown) is coupled to or engages a spring that provides the proper force for pushing a portion of the plunger 80 outside of the bobbin cavity 50 after the plunger 80 has been pulled into the cavity 50 due to a resulting magnetic force when the coil is energized. Electrical wire (not shown) is wound around bobbin 82 to form a coil of the combination solenoid coil and plunger assembly 8. Although for clarity of illustration the coil wire wound around bobbin 82 is not shown in FIGS. 4 and 5, reference numeral 82 in those figures will be assumed to refer to the coil wire forming a coil 82. Further, reference number 82 in FIGS. 10-13 and 16-17 will be assumed to refer to the coil wire or coil wound around the bobbin.

Accordingly, the fault circuit interrupting coil and plunger assembly 8 (hereinafter referred to as coil and plunger assembly 8 or combination coil and plunger assembly 8) has at least one coil 82 and is actuatable by the circuit interrupter actuation signal generated by the fault sensing circuit and is configured to cause electrical discontinuity of power supplied to a load (not shown) by the GFCI device 10 via actuation by the fault sensing circuit upon detection of the occurrence of the predetermined condition.

A lifter 78 and latch 84 assembly is shown where the lifter 78 is positioned underneath the movable bridges. The movable bridges 66 and 64 are secured with mounting brackets 86 (only one is shown) which is also used to secure line terminal 34 and the other line terminal (not shown) to the GFCI device 10. It is understood that the other mounting bracket 86 used to secure movable bridge 64 is positioned directly opposite the shown mounting bracket. The reset button 20 has a reset pin 76 which engages lifter 78 and latch 84 assembly.

Figure 5:
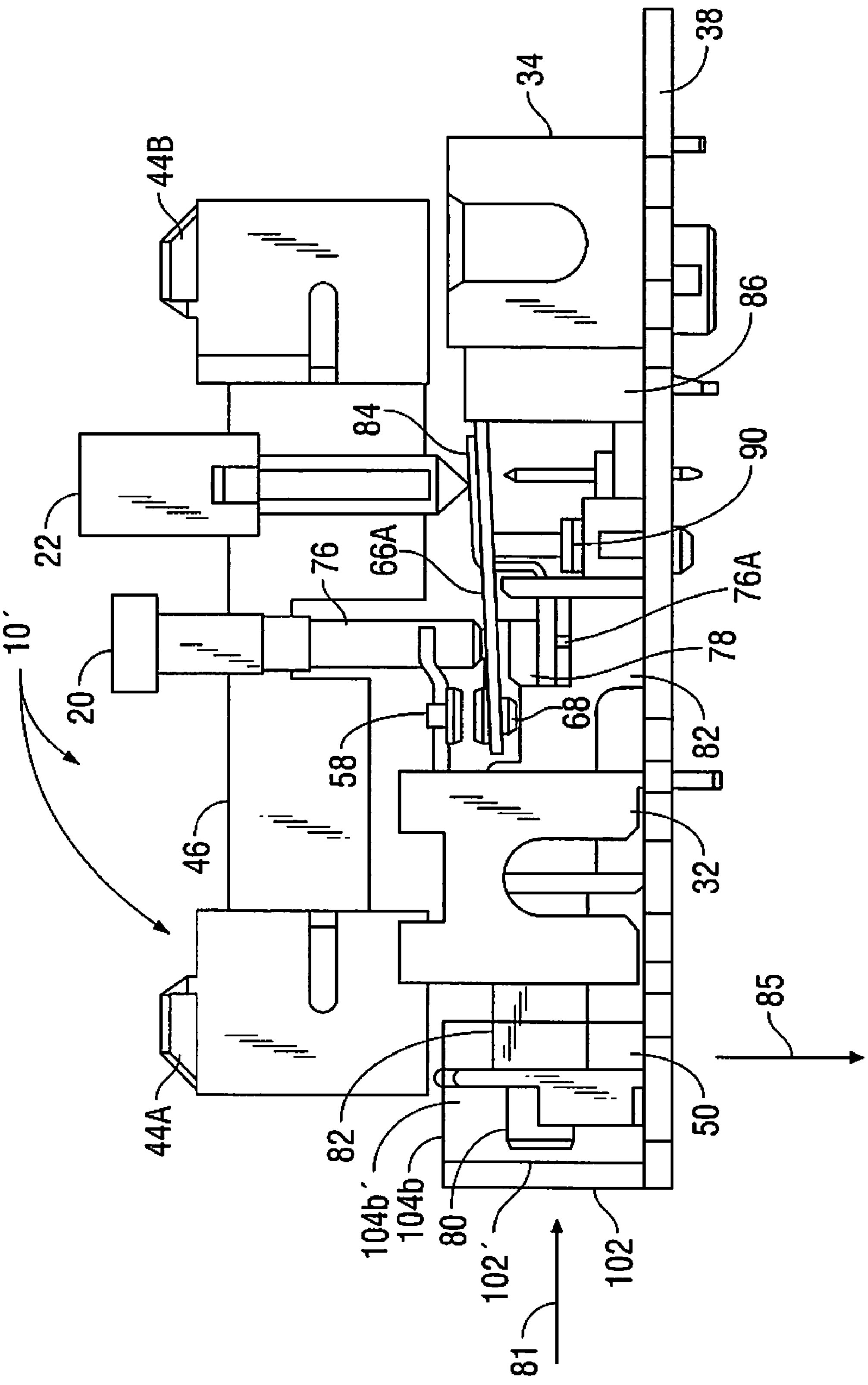
FIG. 5 is a side view of FIG. 4.

FIG. 5 illustrates a side view of the GFCI device 10 of FIG. 4. Prior to the coil 82 being energized, the GFCI device 10 is in a non-actuated configuration. Upon the detection of the occurrence of the predetermined condition, fault sensing circuit assumes that a real transfer of the GFCI device 10 from the non-actuated configuration to an actuated configuration is required such that the plunger 80 will move in a fault direction, i.e., the direction necessary for the plunger 80 to move a distance sufficient to cause disengagement of at least one set of contacts, as described below, and thereby cause electrical discontinuity along a conductive path, i.e., causing the GFCI device 10 to trip. More particularly, when the circuit interrupting actuation signal causes the coil 82 to be energized, plunger 80 is pulled into the coil in the direction shown by arrow 81. The direction shown by arrow 81 is referred to herein as the fault direction 81 of the plunger 80. Connecting portion 66A of movable bridge 66 is shown biased downward (in the direction shown by arrow 85). Although not shown, connecting portion of movable bridge 64 is similarly biased. Also part of a mechanical switch—test arm 90—is shown positioned under a portion of the lifter 78. It should be noted that because frame 48 is not shown, face terminal contact 56 is also not shown.

Thus, referring again to FIGS. 2-5, the GFCI device 10 includes a circuit interrupter 10' that is configured to cause electrical discontinuity in the GFCI device 10 upon the occurrence of at least one predetermined condition. The circuit interrupter 10' includes at least a set of contacts, e.g., bridge contacts 72, 74 (of movable bridge 64) and 68, 70 (of movable bridge 66), that are configured wherein disengagement of at least one of the sets of contacts, e.g., 72 and 74 or 68 and 70, enables the electrical discontinuity along a conductive path in the GFCI device 10. The circuit interrupter 10' also includes the fault sensing circuit failure sensing circuit that may reside in the printed circuit board 38, and that is configured to detect the predetermined condition and to generate a circuit interrupting actuation signal. Additionally, the circuit interrupter 10' includes at least the coil and plunger assembly 8 having the coil 82 and the plunger 80 that are actuatable by the circuit interrupting actuation signal and are configured and disposed wherein movement of the plunger 80 causes the electrical discontinuity via disengagement of at least one of the sets of contacts, e.g., 72 and 74 or 68 and 70, from each other upon detection of the occurrence of the predetermined condition.

Referring also to FIGS. 6-17, GFCI device 10 also includes a test assembly 100 that is configured to enable an at least partial operability self test of the GFCI device 10, without user intervention, to initiate movement of the plunger 80 from a pre-test configuration to a post-test configuration by testing operability of the coil and plunger assembly 8 and of the consequential capability of the fault sensing circuit to effect movement of the plunger 80, including detection of a fault in the coil 82 that is separate from the capability of the plunger 80 to move from a pre-test configuration to a post-test configuration.

As explained in more detail below with respect to FIGS. 6-17, the test assembly 100, alternatively referred to as a circuit interrupting test assembly, includes a test initiation circuit that is configured to initiate and conduct an at least partial test of the circuit interrupter 10', that is, a test of the ability of the circuit interrupter 10' to perform its intended function of causing electrical discontinuity in the GFCI device 10, e.g., a test of the circuit interrupting device 10 that includes initiating movement of the plunger 80 from a pre-test configuration to a post-test configuration. The test assembly 100 also includes a test sensing circuit that is configured to sense a result of the at least partial test of the circuit interrupter 10' or GFCI device 10. The test assembly 100 is configured to enable an at least partial test of the circuit interrupter 10' by testing at least partially movement of the plunger 80 without disengagement of the contacts such as contacts 72 and 74, and 68 and 70. That is, the test assembly 100 is configured to cause the plunger 80 to move, from a pre-test configuration, in a test direction, e.g., test direction 83 or alternate test direction 83', to a post-test configuration, a distance that is insufficient to disengage the at least one set of contacts, e.g., contacts 72 and 74, and 68 and 70, from each other, thereby causing electrical discontinuity along a conductive path in the GFCI device 10.

As defined herein, insufficient movement includes either no detectable movement of the plunger or movement of the plunger that is not sufficient to disengage the at least a set of contacts during a required real transfer of the circuit interrupting device from the non-actuated configuration to the actuated configuration, the actuated configuration resulting in a trip of the GFCI device 10.

Unless otherwise noted, the non-actuated configuration and the pre-test configuration of the GFCI device 10 are equivalent. However, since the actuated configuration of the GFCI device 10 occurs following a real transfer of the GFCI device 10 from the non-actuated configuration, during which time power is supplied to the load side connections through a conductive path in the GFCI device 10, to the actuated configuration, and thus involves causing the plunger 80 to move a distance sufficient to disengage the at least one set of contacts, e.g., contacts 72 and 74, and 68 and 70, the actuated configuration differs from the post-test configuration.

The post-test configuration as defined herein is not a static configuration of the GFCI device 10 but is a transitory state that occurs over a period of time beginning with the initiation of the test actuation signal and ending with the resultant final plunger movement, or lack thereof depending on the results of the test.

To support the detecting and sensing members of the test assembly 100 of the present disclosure, GFCI device 10 also includes a rear support member 102 that is positioned or disposed on the printed circuit board 38 and with respect to the cavity 50 so that one surface 102' of the rear support member 102 may be in interfacing relationship with the first end 80*a* of the plunger 80 and may be substantially perpendicular or orthogonal to the movement of the plunger 80 as indicated by arrow 81.

Additionally, first and second lateral support members 104*a* and 104*b*, respectively, are positioned or disposed on the printed circuit board 38 and with respect to the cavity 50 so that one surface 104*a*' and 104*b*' of first and second lateral support members 104*a* and 104*b*, respectively, may be substantially parallel to the movement of the plunger 80 as indicated by arrow 81 and is in interfacing relationship with the plunger 80. Thus, the rear support member 102 and the first and second lateral support members 104*a* and 104*b*, respectively, partially form a box-like configuration partially around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

Figure 6:
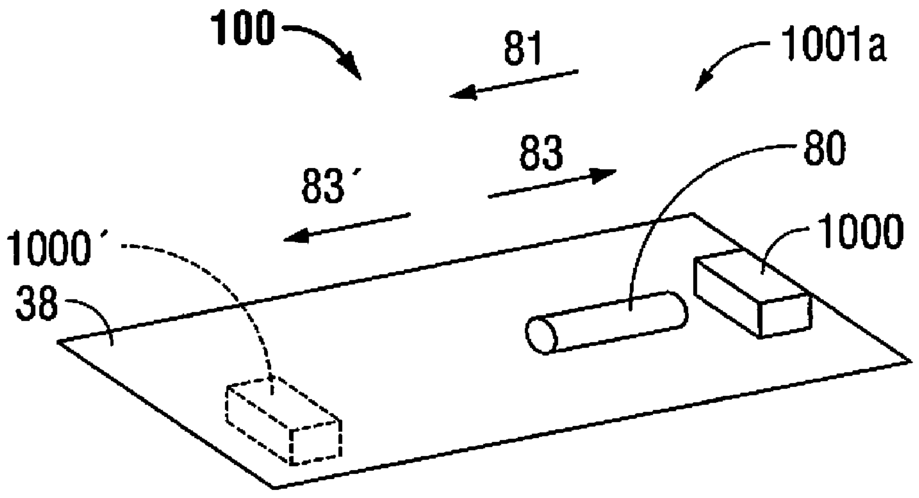
FIG. 6 is a simplified perspective view of a test assembly of a circuit interrupting device according to the present disclosure in a pre-test configuration having at least one sensor that is not in contact with a solenoid plunger in the pre-test configuration.
Figure 7:
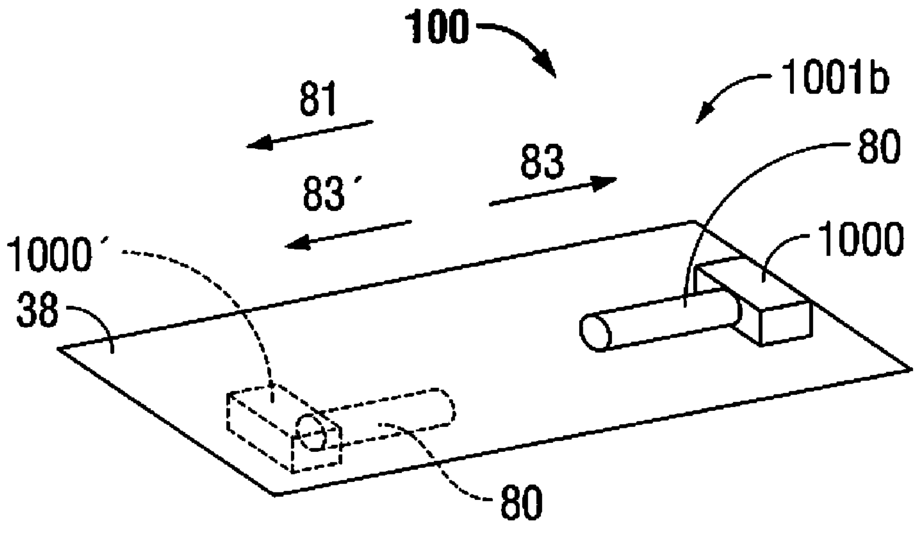
FIG. 7 is a simplified perspective view of the test assembly of the circuit interrupting device of FIG. 7 in a post-test configuration having at least one sensor that is in contact with the solenoid plunger in the post-test configuration.

In conjunction with FIGS. 2-5, while referring particularly to FIGS. 6-7, there is illustrated a simplified view of the test assembly 100 wherein at least one sensor 1000 of the test assembly 100 is disposed wherein, when the circuit interrupter 10' is in a pre-test configuration, e.g., pre-test configuration 1001*a* as illustrated in FIG. 6, the plunger 80 is not in contact with the at least one sensor 1000. When the circuit interrupter 10' is in a post-test configuration, e.g., post-test configuration 1001*b* as illustrated in FIG. 7, the plunger 80 is in contact with the at least one sensor 1000. Thus the at least one sensor 1000 is disposed to detect a change in position of the plunger 80 from the pre-test configuration 1001*a* to the post-test configuration 1001*b*. As illustrated in FIGS. 6-7, the test assembly 100 is configured to cause the plunger 80 to move in a test direction 83 that is different from the fault direction 81, and more particularly as illustrated, in a test direction 83 that is opposite to the fault direction 81.

In an alternate embodiment, at least one sensor 1000' of the test assembly 100 is disposed at a position with respect to the plunger 80 such that when the circuit interrupter 10' transfers from the pre-test configuration 1001*a* (see FIG. 6) to the post-test configuration 1001*b* (see FIG. 7), the test assembly 100 is thus configured to cause the plunger 80 to move in a test direction 83' that is in the same direction as the fault direction 81.

In an alternate embodiment, referring to FIGS. 8-9, again in conjunction with FIGS. 2-5, there is illustrated a simplified view of the test assembly 100 wherein at least one sensor 1000 of the test assembly 100 is disposed wherein, when the circuit interrupter 10' is in a pre-test configuration, e.g., pre-test configuration 1002*a* as illustrated in FIG. 8, the plunger 80 is in contact with the at least one sensor 1000. When the circuit interrupter 10' is in a post-test configuration, e.g., post-test configuration 1002*b* as illustrated in FIG. 9, the plunger 80 is not in contact with the at least one sensor 1000. Thus, in a similar manner as with respect to FIGS. 6-7, the at least one sensor 1000 is disposed to detect a change in position of the plunger 80 from the pre-test configuration 1002*a* to the post-test configuration 1002*b*. As illustrated in FIGS. 6-7, the test assembly 100 is configured to cause the plunger 80 to move in test direction 83' that is in the same direction as the fault direction 81.

As discussed in more detail below, the one or more sensors 1000 or 1000' may include at least one electrical element.

Figure 10:
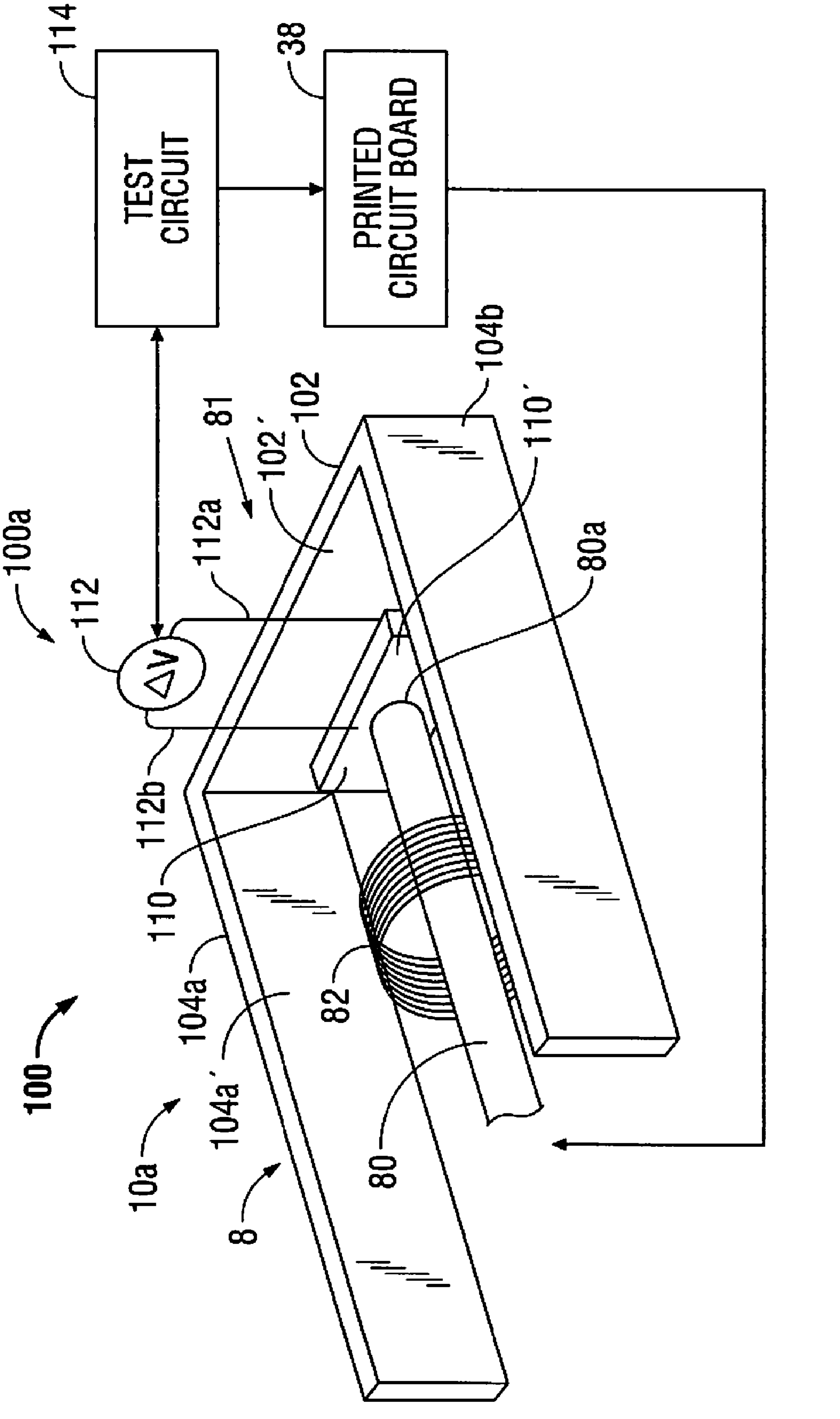
FIG. 10 is a perspective view of one embodiment of a part of a GFCI device that is configured with a piezoelectric member to detect and sense solenoid plunger movement according to the present disclosure.

FIG. 10 illustrates one embodiment of the present disclosure wherein the test assembly 100 of the GFCI device 10 is defined by a test assembly 100*a* wherein at least one sensor includes an electrical element that is in contact with the plunger 80 when the GFCI device 10 is in a pre-test configuration. More particularly, test assembly 100*a* includes as at least one electrical element at least one piezoelectric member 110, e.g. a pad or a sensor, having a surface 110' that is disposed on the surface 102' of the rear support member 102 so that the surface 102' is in interfacing relationship with the first end 80*a* of the plunger 80. The combination solenoid coil and plunger assembly 8 is disposed on the printed circuit board 38 with respect to the piezoelectric member 110 so that when the GFCI device 10*a* is in the pre-test configuration exemplified by pre-test configuration 1002*a* illustrated in FIG. 8, the first end 80*a* of the plunger 80 is in substantially stationary contact with the surface 110' so that substantially no measurable voltage is produced by the piezoelectric member 110. When the plunger 80 is not in contact with the piezoelectric member 110, the piezoelectric member 110 produces substantially no voltage. In the exemplary embodiment illustrated in FIG. 10, as noted above, the circuit interrupter 10' is in the pre-test configuration 1002*a* illustrated in FIG. 8.

A voltmeter 112 is electrically coupled to the piezoelectric sensor 110 via first and second connectors/connector terminals 112*a* and 112*b*, respectively. The test assembly 100*a* of the GFCI device 10*a* further includes a test initiation circuit and a test sensing circuit, which are illustrated schematically as a combined self-test initiation and sensing circuit 114, although the test initiation features and the sensing features can be implemented by a separate test initiation circuit and a separate test sensing circuit. The voltmeter 112 is also electrically coupled to the sensing features of the circuit 114.

Due to the physical characteristics of piezoelectric members such as the piezoelectric member 110, a voltage is only output from the piezoelectric member 110 when it is dynamically contacted by a separate object, e.g., plunger 80, traveling with a velocity sufficient to cause an impact force or pressure to produce a measurable voltage output that is indicative of prior movement of the plunger 80 away from, and re-contact of the plunger 80 with, the piezoelectric member 110.

Thus, the GFCI device 10*a* has a three-phase post-test configuration. In the first phase of the post-test configuration, the GFCI device 10*a* assumes the post-test configuration 1002*b* illustrated in FIG. 9, wherein the plunger 80 moves away from the piezoelectric member 110, represented by the sensor(s) 1000, in the test direction 83 that is the same direction as the fault direction 81. In the second phase of the post-test configuration, the GFCI device 10*a* assumes the pre-test configuration 1001*a* illustrated in FIG. 6 wherein the plunger 80 is not in contact with the piezoelectric member 110, represented by the sensor(s) 1000.

In the third phase of the post-test configuration, the GFCI device 10*a* moves in the test direction 83 to assume the post-test configuration 1001*b* illustrated in FIG. 7 wherein plunger 80 is in contact with, and more particularly dynamically contacts, the piezoelectric member 110, represented by the sensor(s) 1000. Thus, the plunger 80, and particularly the first end 80*a*, dynamically contacts the piezoelectric member 110, and particularly the surface 110', to produce a voltage output from the piezoelectric member 110. The connectors/connector terminals 112*a* and 112*b* connected to the piezoelectric sensor 110 enable measurement of the voltage output by the voltmeter 112 produced by the piezoelectric member 110.

As defined herein, the plunger 80 dynamically contacting the piezoelectric member 110 refers to the plunger 80, or other object, impacting the piezoelectric member 110 with a force sufficient to produce a measurable or detectable voltage output from the piezoelectric member 110, as opposed to substantially stationary contact wherein the plunger 80, or other object, does not produce a measurable or detectable voltage output.

In the event of an at least initially successful test of the combination solenoid coil and plunger assembly 8, the test initiation feature of the circuit 114 causes at least partial movement of the plunger 80 in the test direction 83' that is in the same direction as the forward or fault direction as indicated by arrow 81 so as to sever contact between the first end 80*a* of the plunger 80 and the surface 110' of the piezoelectric sensor 110, thereby maintaining the voltage sensed by the voltmeter 112 at essentially substantially zero. Alternatively, in the event of an initially unsuccessful test of the combination solenoid coil and plunger assembly 8, the test initiation feature of the circuit 114 still attempts to cause at least partial movement of the plunger 80 in the forward or fault direction as indicated by arrow 81 by producing a magnetic field due to electrical current flow through the coil (not shown) around bobbin 82 so as to sever contact between the first end 80*a* of the plunger 80 and the surface 110' of the piezoelectric member 110, thereby also maintaining the voltage sensed by the voltmeter 112 at essentially or substantially zero, although no movement of the plunger 80 in the forward direction as indicated by arrow 81 may have occurred.

In the event of an at least initially successful test, when the test initiation feature of the circuit 114 stops influencing or causing movement of the plunger 80, a compression spring (not shown) is housed and disposed in the bobbin 82 such that a compression force caused by the compression spring acts against the plunger 80. The force of the spring is biased against the surface 110' of the piezoelectric sensor 110 when the coil of the bobbin 82 is not energized. The plunger 80 assumes the third phase 1001*b* of the post-test configuration (see FIG. 7) and returns to the pre-test configuration 1002*a* (see FIG. 8) and dynamically strikes or contacts the surface 110' of the piezoelectric member 110 thereby creating a measurable or detectable voltage from the piezoelectric member 110 in the event of a successful return of the plunger 80 to the pre-test configuration 1002*a*.

In the event of a completely successful test, the detectable voltage sensed or detected by the sensing feature of the test initiation and sensing circuit 114 via the voltmeter 112 is of a magnitude V1 or greater that is pre-determined to be indicative of movement of plunger 80 during the test that is a pre-cursor to adequate or sufficient movement of the plunger 80 during a required real actuation of the GFCI device 10, i.e., a required real transfer of the GFCI device 10 from the non-actuated configuration to the actuated configuration as described above with respect to FIG. 5. In the event of an only partially successful test, the detectable voltage sensed or detected by the sensing feature of the test initiation and sensing circuit 114 via voltmeter 112 is of a magnitude V1' that is less than the magnitude V1 and so is pre-determined to be indicative of movement of plunger 80 during the test that is a pre-cursor to inadequate or insufficient movement of the plunger 80 during a required real actuation of the GFCI device 10, i.e., a required real transfer of the GFCI device 10 from the non-actuated configuration to the actuated configuration as described above with respect to FIG. 5.

In the event of an initially unsuccessful test of the combination solenoid coil and plunger assembly 8, the test initiation feature of the circuit 114, despite attempting to produce a magnetic field due to electrical current flow through the coil (not shown) around bobbin 82, causes no or insufficient movement of the plunger 80 so that no voltage is detected by the voltmeter 112 or a voltage is detected by the voltmeter 112 having a magnitude that is less than or equal to the magnitude V1' that is pre-determined to be indicative of movement of plunger 80 during the test that is a pre-cursor to inadequate or insufficient movement of the plunger 80 during a required real actuation of the GFCI device 10 as previously described.

In one embodiment, the sensing feature of the circuit 114 is electrically coupled to a microprocessor (not shown) residing on the printed circuit board 38 that annunciates, or trips the GFCI device 10*a*, in the event of failure of the self-test.

Thus, GFCI device 10*a* is an example of a GFCI device according to the present disclosure wherein the plunger is configured to move in a first direction, e.g., as indicated by arrow 81, to cause electrical discontinuity in power output to a load upon actuation by the fault sensing circuit (residing in the printed circuit board 38) and that further includes at least one sensor configured and disposed wherein the plunger 80 is in contact with the one or more sensors when the circuit interrupter 10' is in a pre-test configuration, and wherein the plunger 80 is not in contact with the one or more sensors when the circuit interrupter 10' is in a post-test configuration.

Those skilled in the art will recognize that the GFCI device 10*a* may be configured wherein when the circuit interrupter 10' is in a pre-test configuration, the plunger 80 may not be in contact with the piezoelectric member 110 but again dynamically contacts the piezoelectric surface 110' to produce a voltage upon returning from a post-test configuration, or upon being transferred from a pre-test configuration. The location of the piezoelectric member(s) 110 may be adjusted accordingly.

Additionally, those skilled in the art will recognize that GFCI device 10*a* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*a* includes members, e.g., the test initiation and sensing circuit 114 and the test assembly 100*a*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Thus, the circuit interrupter 10' includes a fault sensing circuit (not shown but may be integrated within and reside within the printed circuit board 38) that is configured to detect the predetermined condition and to generate a circuit interrupting actuation signal, and actuate the fault circuit interrupting coil and plunger assembly 8. The coil and plunger assembly 8 has at least one coil 82 and is actuatable by the circuit interrupting actuation signal generated by the fault sensing circuit and is configured and disposed wherein movement of the plunger 80 causes the electrical discontinuity by disengagement of at least one set of the sets of contacts, e.g., 72 and 74 or 68 and 70, and thereby cause electrical discontinuity along a conductive path upon detection of the occurrence of the predetermined condition.

The GFCI device 10 also includes the test assembly 100 that is configured to enable periodically an at least partial operability self test of the circuit interrupter, without user intervention, via self testing at least partially operability of coil and plunger assembly 8 and/or of the fault sensing circuit.

As will be appreciated and understood by those skilled in the art, the foregoing description of the circuit interrupter 10' is applicable to the remaining embodiments of the GFCI device 10 as described with respect to, and illustrated in, FIGS. 11-17.

Alternatively, as described below in FIGS. 11-13, the at least one electrical element may be characterized by an impedance value such that when the plunger 80 is in contact with the electrical element, a first impedance value is produced by the at least one electrical element, and when the plunger 80 is not in contact with the electrical element, a second impedance value is produced by the at least one electrical element. Correspondingly, the at least one electrical element may be at least one of a resistor or resistive member, a capacitor or capacitive member, and an inductor or inductive member.

Figure 8:
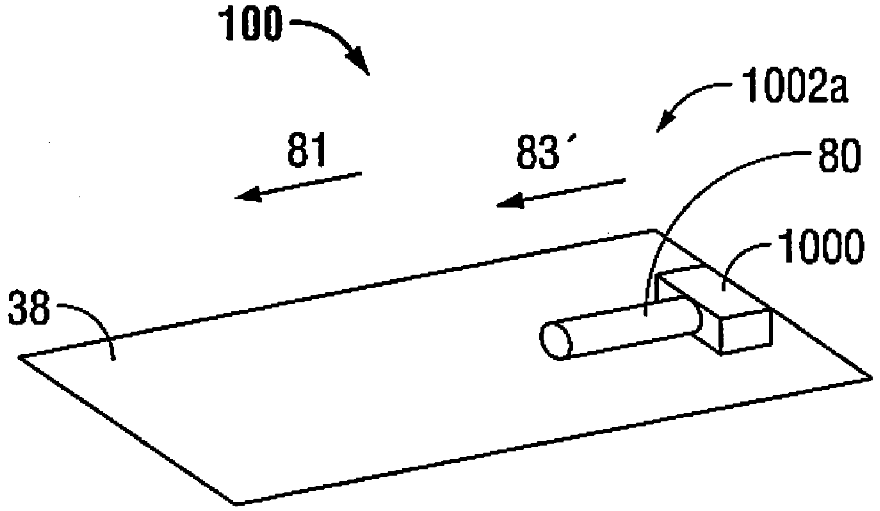
FIG. 8 is a simplified perspective view of a test assembly of a circuit interrupting device according to the present disclosure in a pre-test configuration having at least one sensor that is in contact with a solenoid plunger in the pre-test configuration.
Figure 9:
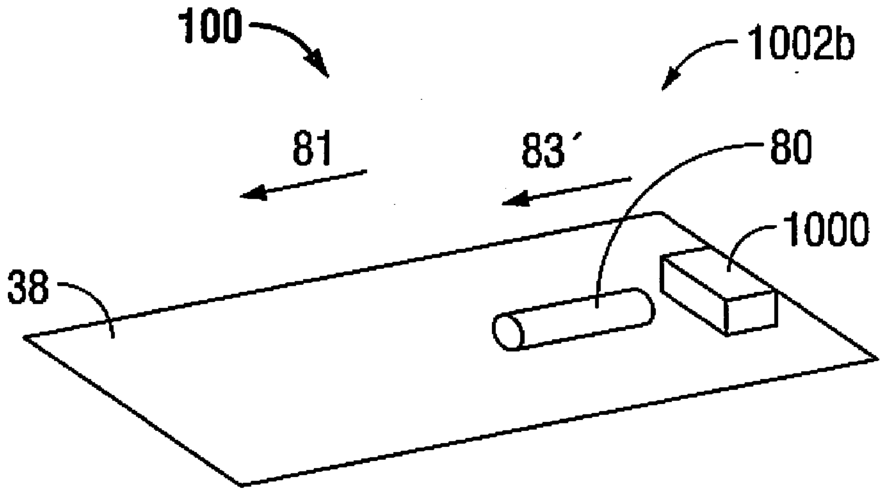
FIG. 9 is a simplified perspective view of the test assembly of the circuit interrupting device of FIG. 8 in a post-test configuration having at least one sensor that is not in contact with the solenoid plunger in the post-test configuration.
Figure 11:
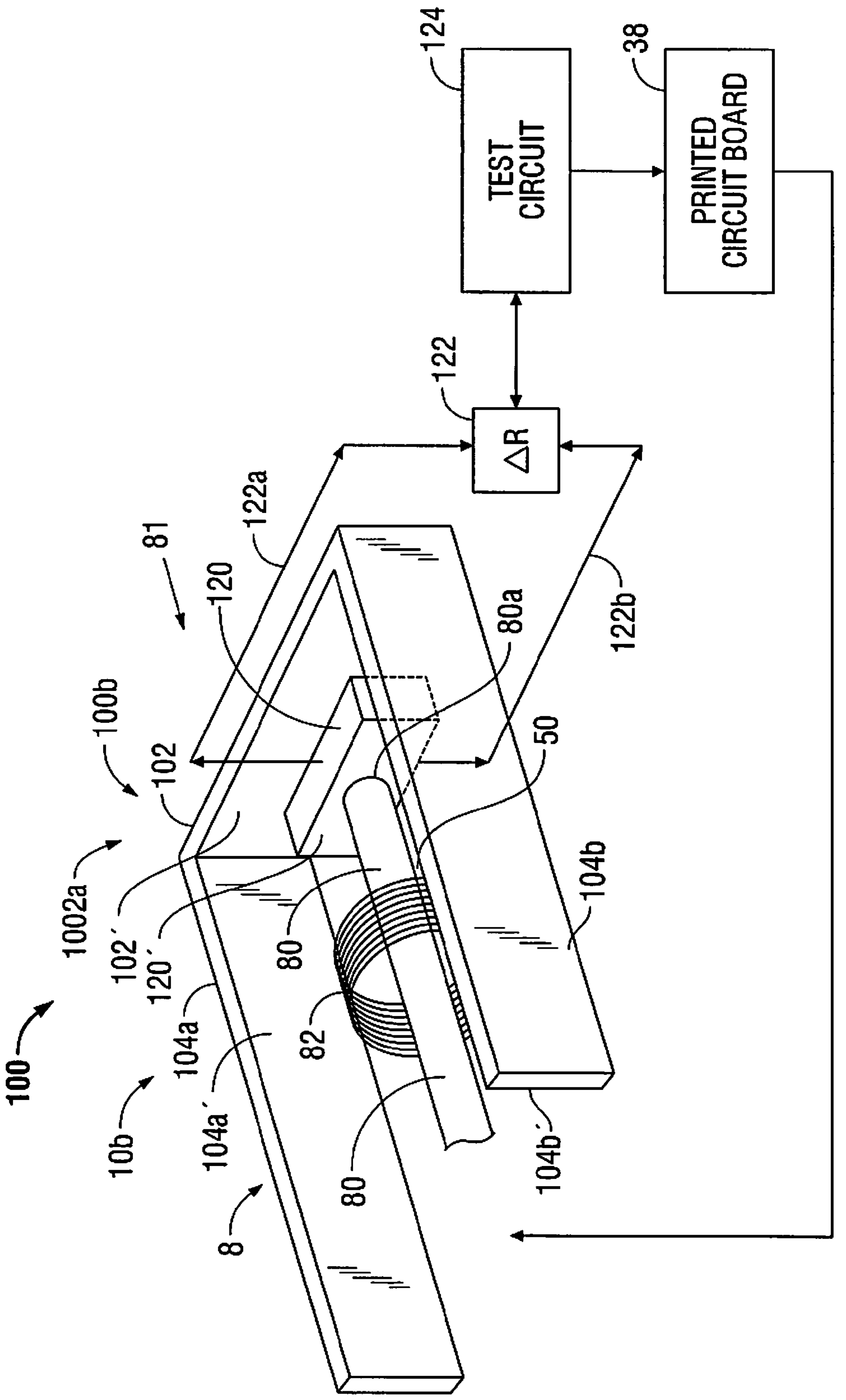
FIG. 11 is a perspective view of one embodiment of a part of a GFCI device that is configured with a resistive member to detect and sense solenoid plunger movement according to the present disclosure.

Accordingly, FIG. 11 illustrates one embodiment of the GFCI device 10 of the present disclosure wherein the test assembly 100 is defined by test assembly 100*b* wherein test assembly 100*b* includes as an electrical element a resistive member in contact with plunger 80 in the pre-test configuration 1002*a* of the GFCI device 10, as illustrated in FIG. 8.

More particularly, GFCI device 10*b* is essentially identical to GFCI device 10*a* except that the piezoelectric member 110 of test assembly 100*a* is replaced by a resistive member, e.g., resistive pad or sensor 120 of test assembly 100*b*, voltmeter 112 and connector/connector terminals 112*a* and 112*b* of test assembly 100*a* are replaced by ohmmeter 122 and connector/connector terminals 122*a* and 122*b*, respectively, of test assembly 100*b* and test initiation and test sensing circuit 114 of test assembly 100*a* is replaced by test initiation and test sensing circuit 124 of test assembly 100*b*. Thus, the first end 80*a* of the plunger 80 is now in contact with surface 120' of resistive member 120 when the combination solenoid coil and plunger assembly 8 is in the pre-test configuration 1002*a* so that the plunger 80 is disposed on the printed circuit board 38 and with respect to the resistive member 120 so that the first end 80*a* of the plunger 80 is in contact with the surface 120' to cause a sensible or measurable first impedance value or load represented by first resistance value R1 characteristic of the resistive member 120 when the GFCI device 10*b* is in pre-test configuration 1002*a*. In a similar manner, the resistance meter 122 is electrically coupled to the resistive member or sensor 120 via first and second connectors/connector terminals 122*a* and 122*b*, respectively.

The test assembly 100*b* of GFCI device 10*b* again further includes a test initiation circuit and a test sensing circuit, which are illustrated schematically as a combined self-test initiation and test sensing circuit 124, although the test initiation features and the sensing features again can be implemented by separate test initiation and test sensing circuits as explained above. The resistance meter 122 is also electrically coupled to the sensing features of the circuit 124.

In a similar manner as before, the GFCI device 10*b* assumes the post-test configuration 1002*b* as illustrated in FIG. 9 wherein in the event of a successful test of the combination solenoid coil and plunger assembly 8, the test initiation feature of the circuit 124 causes at least partial movement of the plunger 80 in the test direction 83' that is the same direction as the forward or fault direction as indicated by arrow 81 to move away from the resistive member 120 so as to sever contact between the first end 80*a* of the plunger 80 and the surface 120' of the resistive member 120, thereby decreasing the resistance sensed by the resistance meter 122 from the first resistance value R1 to a second impedance value or load represented by second resistance value R2 characteristic of the resistive member 120. Conversely, in the event of an unsuccessful test of the combination solenoid coil and plunger assembly 8, the test initiation feature of the circuit 124 causes no or insufficient movement of the plunger 80 so that a sensible or measurable resistance substantially equal to the first resistance value R1 remains sensed or measurable by the resistance meter 122. Again, in one embodiment, the sensing feature of the circuit 124 is electrically coupled to a microprocessor (not shown) residing on the printed circuit board 38 that annunciates, or trips the GFCI device 10*b*, in the event of failure of the self-test.

When the plunger 80 returns to the pre-test configuration 1002*a* following the post-test configuration 1002*b*, the plunger 80, and particularly the first end 80*a*, contacts the resistive member 120, and particularly the surface 120', to again produce a resistance output from the resistive member 120 that is substantially equal to the first resistance value R1 prior to the test. The connectors/connector terminals 122*a* and 122*b* connected to the resistance member 120 enable measurement by the resistance meter 122 of the resistance output produced by the resistance member 120.

Those skilled in the art will recognize that the GFCI device 10*b* may also be configured with the test assembly 100 illustrated in FIGS. 6-7 wherein when the circuit interrupter 10' is in the pre-test configuration 1001*a* illustrated in FIG. 6, the plunger 80 is not in contact with the resistive member 120 so that the first impedance value or load represents an impedance value when the plunger 80 is not in contact with the resistive member 120. Conversely, when the circuit interrupter 10' is in the post-test configuration 1001*b* illustrated in FIG. 7, the plunger 80 is in contact with the resistive surface 120' so that the second impedance value or load represents an impedance value when the plunger 80 is in contact with the resistive member 120. The location of the resistive member(s) 120 may be adjusted accordingly.

In a similar manner as described above, those skilled in the art will recognize that GFCI device 10*b* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*b* includes members, e.g., the test initiation and sensing circuit 124 and the test assembly 100*b*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Figure 12:
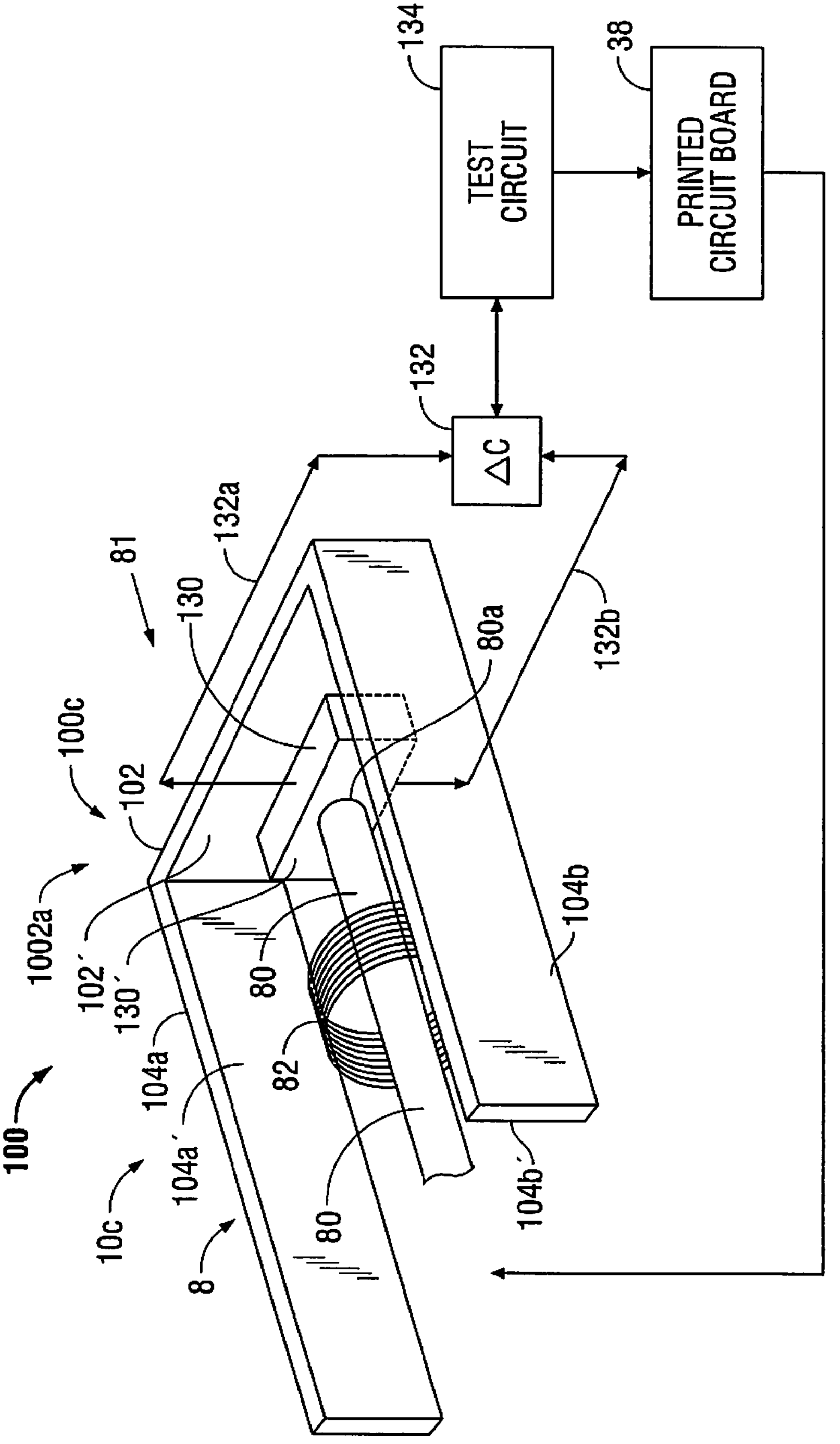
FIG. 12 is a perspective view of one embodiment of a part of a GFCI device that is configured with a capacitive member to detect and sense solenoid plunger movement according to the present disclosure.

In a similar manner, FIG. 12 illustrates one embodiment of the present disclosure wherein the test assembly 100 of GFCI device 10 is defined by test assembly 100*c* wherein test assembly 100*c* includes as an electrical element a capacitive member in contact with plunger 80 in the pre-test configuration 1002*a* of the GFCI device 10, as illustrated in FIG. 8.

More particularly, GFCI device 10*c* is again essentially identical to GFCI device 10*b* except that the resistive pad or indicator 120 of test assembly 100*b* is replaced by capacitive pad or indicator 130 of test assembly 100*c*, resistance meter 122 and connector/connector terminals 122*a* and 122*b* of test assembly 100*b* are replaced by capacitance meter 132 and connector/connector terminals 132*a* and 132*b*, respectively, of test assembly 100*c* and test initiation and test sensing circuit 124 of test assembly 100*b* is replaced by test initiation and test sensing circuit 134 of test assembly 100*c*. The capacitive pad or indicator or transducer, referred to as a capacitive member 130 has an initial charge providing an impedance value or load or a capacitance value or load C. Thus, the first end 80*a* of the plunger 80 is now in contact with surface 130' of capacitance member 130 when the combination solenoid coil and plunger assembly 8 is in the pre-test configuration 1002*a* so that the plunger 80 is disposed on the printed circuit board 38 with respect to the capacitive member 130 so that the first end 80*a* of the plunger 80 is in contact with the surface 130' to cause a sensible or measurable first impedance or capacitance value C1 (different from C) characteristic of the capacitive member 130 when the GFCI device 10*c* is in the pre-test configuration 1002*a*. In a similar manner, the capacitance meter 132 is electrically coupled to the capacitive member 130 via first and second connectors/connector terminals 132*a* and 132*b*, respectively.

The test assembly 100*c* of GFCI device 10*c* again further includes a test initiation circuit and a test sensing circuit, which are illustrated schematically as a combined self-test initiation and test sensing circuit 134, although the test initiation features and the sensing features again can be implemented by separate circuits as previously described above. The capacitance meter 132 is also electrically coupled to the sensing features of the circuit 134.

In a similar manner as before, the GFCI device 10 assumes the post-test configuration 1002*b* as illustrated in FIG. 9 wherein in the event of a successful test of the combination solenoid coil and plunger assembly 8, the test initiation feature of the circuit 134 causes at least partial movement of the plunger 80 in the test direction 83' that is the same direction as the forward or fault direction as indicated by arrow 81 to move away from the capacitive member 130 so as to sever contact between the first end 80*a* of the plunger 80 and the surface 130' of the capacitive member 130, thereby decreasing the capacitance sensed by the capacitance meter 132 from the first capacitance value C1 to a second impedance or capacitance value C2 characteristic of the capacitive member 130 when the plunger 80 is not in contact with the capacitive member 130. Conversely, in the event of an unsuccessful test of the combination solenoid coil and plunger assembly 8, the test initiation feature of the circuit 134 causes no or insufficient movement of the plunger 80 so that a sensible or measurable capacitance substantially equal to the first capacitance value C1 remains sensed or measurable by the capacitance meter 132. Again, in one embodiment, the sensing feature of the circuit 134 is electrically coupled to a microprocessor (not shown) residing on the printed circuit board 38 that annunciates, or trips the GFCI device 10*c*, in the event of failure of the self-test.

When the plunger 80 returns to the pre-test configuration 1002*a* following the post-test configuration 1002*b*, the plunger 80, and particularly the first end 80*a*, contacts the capacitive member 130, and particularly the surface 130', to again produce a capacitance output from the capacitive member 130 that is substantially equal to the first capacitance value prior to the test. The connectors/connector terminals 132*a* and 132*b* connected to the capacitance member 130 enable measurement by the capacitance meter 132 of the capacitance output produced by the capacitance member 130.

Those skilled in the art will recognize that the GFCI device 10*c* may also be configured with the test assembly 100 illustrated in FIGS. 6-7 wherein when the circuit interrupter 10' is in the pre-test configuration 1001*a* illustrated in FIG. 6, the plunger 80 is not in contact with the capacitive member 130 so that the first impedance value represents an impedance value or load when the plunger 80 is not in contact with the capacitive member 130. Conversely, when the circuit interrupter 10' is in the post-test configuration 1001*b* illustrated in FIG. 7, the plunger 80 is in contact with the capacitive surface 130' so that the second impedance value represents an impedance value or load when the plunger 80 is in contact with the capacitive member 130. The location of the capacitive member(s) 130 may be adjusted accordingly.

In a similar manner as described above, those skilled in the art will recognize that GFCI device 10*c* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*c* includes members, e.g., the test initiation and sensing circuit 134 and the test assembly 100*c*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Figure 13:
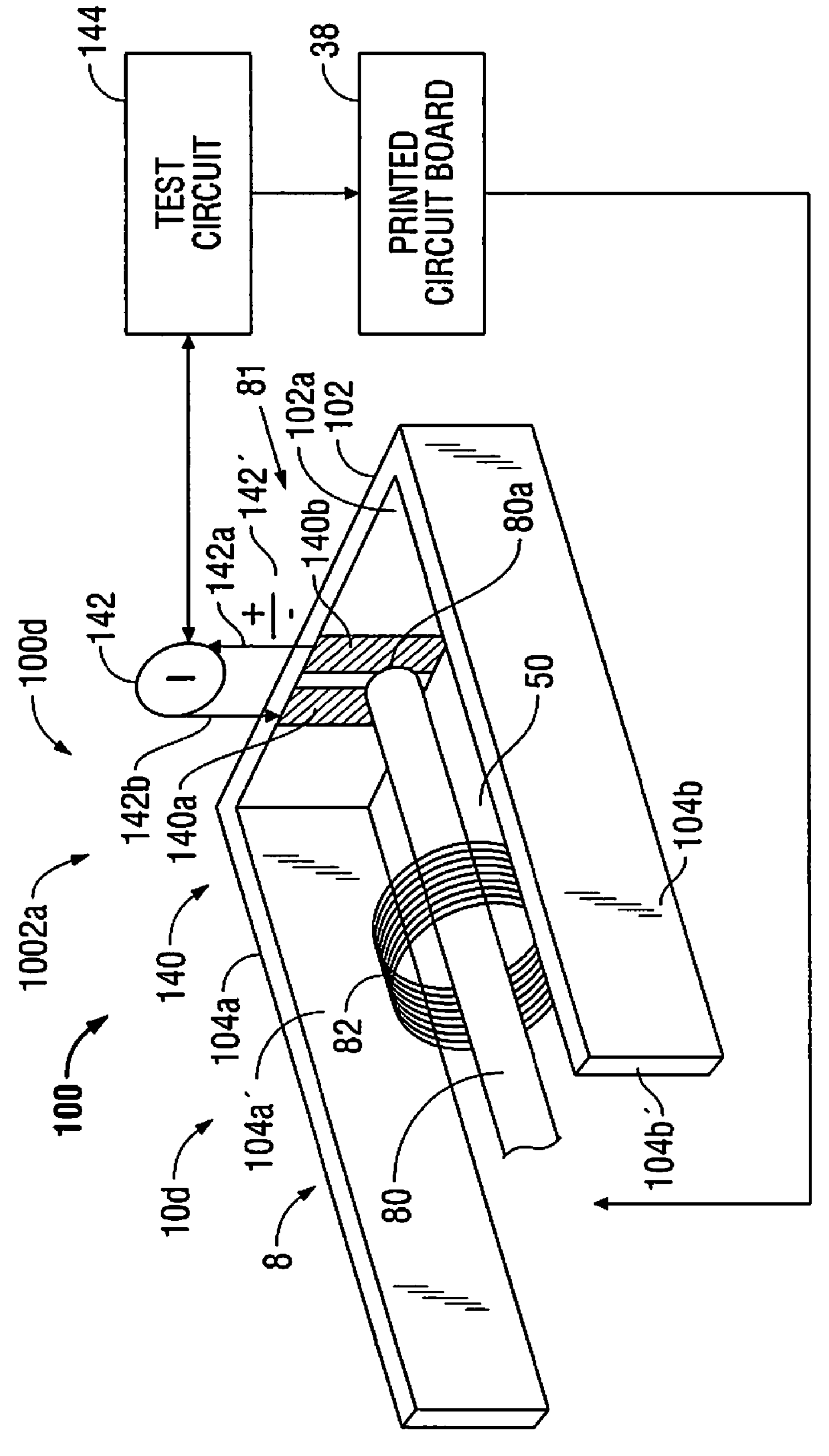
FIG. 13 is a perspective view of one embodiment of a part of a GFCI device that is configured with conductive members forming a conductive path to detect and sense solenoid plunger movement according to the present disclosure.

In a still similar manner, FIG. 13 illustrates one embodiment of the present disclosure wherein test assembly 100 of GFCI device 10 is defined by test assembly 100*d* wherein test assembly 100*d* includes as at least one electrical element conductive material in contact with the plunger during the pre-test configuration 1002*a* of the GFCI device 10 as illustrated in FIG. 8. More particularly, GFCI device 10*d* is again essentially identical to GFCI device 10*b* except that the resistive member 120 of test assembly 100*b* is replaced by first and second electrically conductive members 140*a* and 140*b*, e.g., conductive tape strips or similarly configured material, respectively, of test assembly 100*d*, resistance meter 122 and connector/connector terminals 122*a* and 122*b* of test assembly 100*b* are replaced by current meter 142 and connector/connector terminals 142*a* and 142*b*, respectively, of test assembly 100*d*, and test initiation and test sensing circuit 124 of test assembly 100*b* is replaced by test initiation and test sensing circuit 144 of test assembly 100*d*.

In addition, test assembly 100*d* includes a current source 142' such as a battery or power supply that is disposed with respect to a circuit 140 formed by the first and second electrically conductive tape strips 140*a* and 140*b*, respectively, the current meter 142 and the connector/connector terminals 142*a* and 142*b* to enable an electrically conductive path therein. In place of a battery or similar power supply, current may be supplied to the circuit 140, in the same manner as with respect to the fault or failure sensing circuit described above, the current for the electrically conductive tape strips 142*a* and 142*b* may be supplied by a circuit that is electrically coupled to the printed circuit board 38 and the connection points of the tape can be positioned anywhere on the printed circuit board. The first and second electrically conductive members 140*a* and 140*b*, respectively, are disposed on the surface 102' of the rear support member 102 to be electrically isolated from one another and with respect to the solenoid coil and plunger 80 such that when the plunger 80 is in pre-test configuration 1002*a*, the first end 80*a* of the plunger 80 makes electrical contact with both the first and second conductive members 140*a* and 140*b*, respectively, to form a continuous electrical circuit or conductive path.

In a similar manner as the previous embodiments, the test assembly 100*d* of GFCI device 10*d* again further includes a test initiation circuit and a test sensing circuit, which are illustrated schematically as a combined self-test initiation and sensing circuit 144, although again the test initiation features and the test sensing features again can be implemented by separate circuits as described above. The current meter 142 is also electrically coupled to the sensing features of the circuit 144. In addition, the current source 142', when it is an independent member such as a battery or similar power supply, is also electrically coupled to the sensing features of the circuit 144.

In a similar manner as before, the GFCI device 10 assumes the post-test configuration 1002*b* as illustrated in FIG. 9 wherein in the event of a successful test of the combination solenoid coil and plunger assembly 8, the test initiation feature of the circuit 144 causes at least partial movement of the plunger 80 in test direction 83' which is the same direction as the forward or fault direction as indicated by arrow 81 to move away from the first and second electrically conductive members 140*a* and 140*b*, respectively, so as to sever contact between the first end 80*a* of the plunger 80 and the conductive members 140*a* and 140*b*, thereby terminating the conductive path that allows the current I in the circuit 140.

Conversely, in the event of an unsuccessful test of the combination solenoid coil and plunger assembly 8, the test initiation feature of the circuit 144 causes no or insufficient movement of the plunger 80, the conductive path provided by the circuit 140 is maintained so that a sensible or measurable current I' substantially equal to the first current I remains sensed or measurable by the current meter 142. Since the test sensing feature of the circuit 144 is also electrically coupled to the current source 142' to verify the presence of current I prior to the test, the chances of a false indication of a successful test are reduced. Again, in one embodiment, the sensing feature of the circuit 144 is electrically coupled to a microprocessor (not shown) residing on the printed circuit board 38 that annunciates, or trips the GFCI device 10*d*, in the event of failure of the self-test.

When the plunger 80 returns to the pre-test configuration 1002*a* following the post-test configuration 1002*b*, the plunger 80, and particularly the first end 80*a*, contacts the conductive members 140*a* and 140*b* to again provide electrical continuity to electrical circuit 140 to produce a current that that is substantially equal to the first current value I prior to the test. The connectors/connector terminals 142*a* and 142*b* connected to the current meter 142 enable measurement by the current meter 142 of the current I.

Thus the first and second conductive members 140*a* and 140*b*, respectively, are configured wherein when the plunger 80 is in pre-test configuration 1002*a*, the plunger 80 is in contact with the first and second conductive members 140*a* and 140*b*, respectively, forming a conductive path there between. Upon the plunger 80 entering the post-test configuration 1002*b* to move away from at least one of the first and second conductive members 140*a* and 140*b*, respectively, continuity of the conductive path of circuit 140 is terminated. Measurement, via the connectors/connector terminals 142*a* and 142*b* that is indicative of termination of the continuity of the conductive path of circuit 140 is indicative of movement of the plunger 80.

In a similar manner as described above, those skilled in the art will recognize that the GFCI device 10*d* may also be configured with the test assembly 100 illustrated in FIGS. 6-7 wherein when the circuit interrupter 10' is in pre-test configuration 1001*a*, the plunger 80 is not in contact with the conductive members 140*a* and 140*b* when the circuit interrupter 10' is in a the pre-test configuration 1001*a* and wherein when the circuit interrupter 10' is in the post-test configuration 1001*b*, the conductive members 140*a* and 140*b* are in contact with the plunger 80. The location of the conductive member(s) 140*a* and 140*b* may be adjusted accordingly.

Again, in a similar manner as described above, those skilled in the art will recognize that GFCI device 10*d* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*d* includes members, e.g., the test initiation and sensing circuit 144 and the test assembly 100*d*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Those skilled in the art will recognize that, when the at least one electrical element is characterized by an impedance load, e.g., an inductor or inductive member (not shown), the at least one electrical element may be disposed such that when the plunger 80 is in the proximity of the electrical element, a first impedance value characteristic thereof is produced by the at least one electrical element, and when the plunger 80 is not in the proximity of the at least one electrical element, a second impedance value characteristic thereof is produced by the at least one electrical element.

Turning now to FIGS. 14 and 15, again in conjunction with FIGS. 2-5, there is illustrated a simplified view of a test assembly 100' that is in all respects identical to test assembly 100 except that test assembly 100' includes at least one sensor as exemplified by first sensor 1010*a* and second sensor 1010*b* that are disposed such that the plunger 80 travels in fault direction 81 and the sensors 1010*a* and 1010*b* are oppositely positioned with respect to each other on either side of the path of travel of the plunger in the fault direction 81 such that neither end 80*a*, designated as the rear end 80*a* of the plunger 80, nor front end 80*b* of the plunger 80, come into contact with either of the sensors 1010*a* or 1010*b*, although other portions of the plunger 80 may come into contact therewith. The positioning of the sensors 1010*a* and 1010*b* establish a path 160' between sensor 1010*a* on one side of the path of travel of the plunger in the test direction 83' and sensor 1010*b* on the opposite side of the path of travel of the plunger in the test direction 83'.

Figure 14:
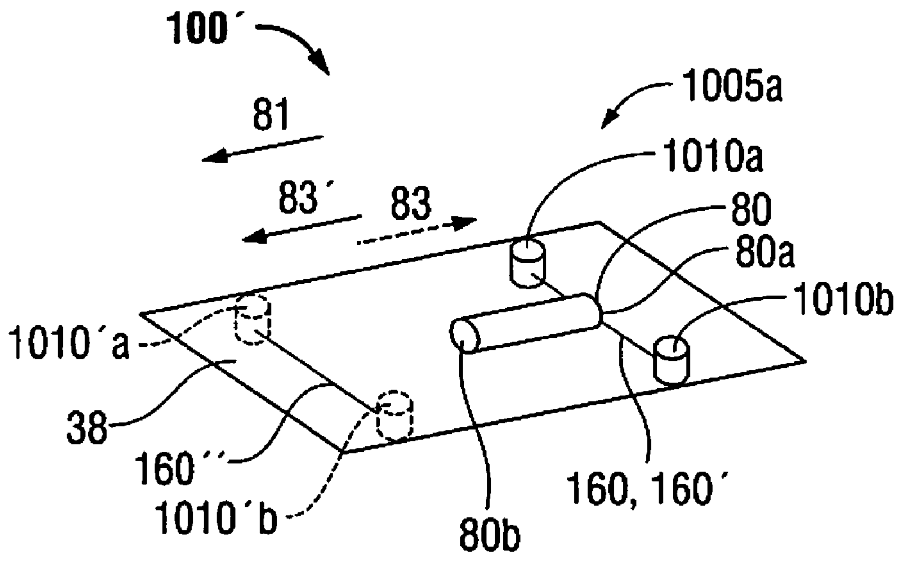
FIG. 14 is a simplified perspective view of a test assembly of a circuit interrupting device according to the present disclosure in a pre-test configuration wherein a solenoid plunger is in a position with respect to at least one sensor in a pre-test configuration.
Figure 15:
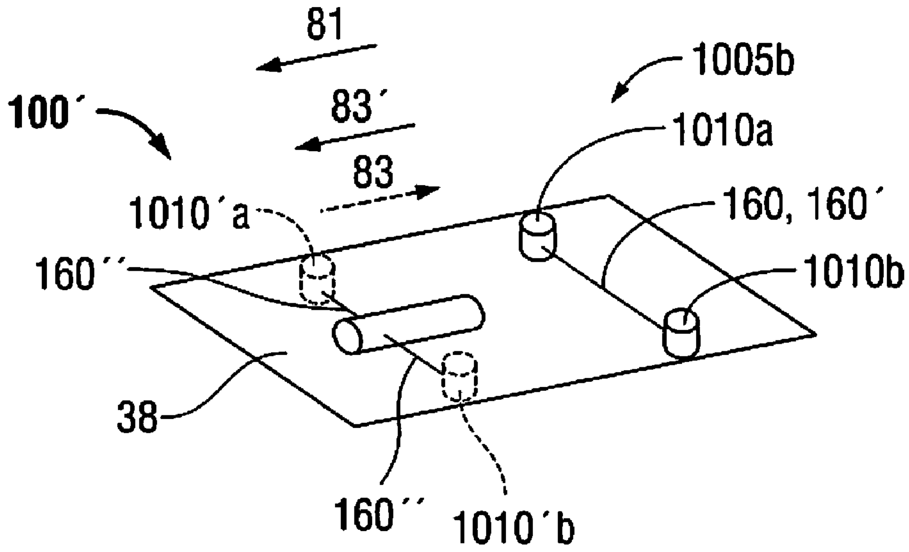
FIG. 15 is a simplified perspective view of the test assembly of the circuit interrupting device of FIG. 14 wherein the solenoid plunger is in another position with respect to at least one sensor in a post-test configuration.

The test assembly 100' is configured wherein when the plunger 80 is in a pre-test configuration 1005*a*, as illustrated in FIG. 14, the plunger 80 is in a first position with respect to the sensors 1010*a* and 1110*b* and when the plunger is in a post-test configuration 1005*b*, as illustrated in FIG. 15, the plunger 80 is in a second position with respect to the sensors 1010*a* and 1010*b*.

More particularly, in the exemplary embodiment illustrated in FIG. 14, when the GFCI device 10 assumes the pre-test configuration 1005*a*, the plunger 80 is in the first position between the sensors 1010*a* and 1010*b* in the path 160' between the sensors 1010*a* and 1010*b*. As illustrated in FIG. 15, when the GFCI device 10 assumes the post-test configuration 1005*b*, the plunger 80 travels in the test direction 83' that is in the same direction as the fault direction 81 such that the plunger 80 is in the second position that is not in the path 160' between sensor 1010*a* and sensor 1010*b*.

Those skilled in the art will recognize that when the GFCI device 10 assumes the post-test configuration 1005*b*, the plunger 80 may travel to a second position that is between sensors 1010*a* and 1010*b* in the path 160' but such that the second position with respect to the sensors 1010*a* and 1010*b* differs from the first position with respect to the sensors 1010*a* and 1010*b*.

Referring again to FIG. 14, in an alternate exemplary embodiment, the test assembly 100' may include at least one sensor as exemplified by first sensor 1010'*a* and second sensor 1010'*b* that are also disposed such that the plunger 80 travels in fault direction 81 and the sensors 1010'*a* and 1010'*b* are oppositely positioned with respect to each other on either side of the path of travel of the plunger in the fault direction 81 such that neither end 80*a*, designated as the rear end 80*a* of the plunger 80, nor front end 80*b* of the plunger 80, come into contact with either of the sensors 1010'*a* or 1010'*b*, although again other portions of the plunger 80 may come into contact therewith. In a similar manner, the positioning of the sensors 1010'*a* and 1010'*b* establish a path 160" between sensor 1010'*a* on one side of the path of travel of the plunger in the test direction 83' and sensor 1010'*b* on the opposite side of the path of travel of the plunger in the test direction 83'.

The test assembly 100' is now configured wherein when the plunger 80 is in the pre-test configuration 1005*a*, as illustrated in FIG. 14, the plunger 80 is in a first position with respect to the sensors 1010'*a* and 1010'*b* and when the plunger is in the post-test configuration 1005*b*, as illustrated in FIG. 15, the plunger 80 is in a second position with respect to the sensors 1010'*a* and 1010'*b*.

More particularly, in the exemplary embodiment illustrated in FIG. 14, when the GFCI device 10 assumes the pre-test configuration 1005*a*, the plunger 80 is in a position that is not between the sensors 1010'*a* and 1010'*b* and not in the path 160" between the sensors 1010*a* and 1010*b*. As illustrated in FIG. 15, when the GFCI device 10 assumes the post-test configuration 1005*b*, the plunger 80 travels in the test direction 83' that is in the same direction as the fault direction 81 such that the plunger 80 is in a position that is in the path 160" between sensor 1010'*a* and sensor 1010'*b*.

Those skilled in the art will again recognize that when the GFCI device 10 assumes the post-test configuration 1005*b*, the plunger 80 may travel to a second position that is not between sensors 1010'*a* and 1010'*b* in the path 160" but such that the second position with respect to the sensors 1010'*a* and 1010'*b* differs from the first position with respect to the sensors 1010'*a* and 1010'*b*.

In view of FIGS. 14 and 15, FIGS. 16 and 17 illustrate corresponding specific examples of embodiments of a GFCI device according to the present disclosure wherein the test assembly 100 of GFCI device 10 is defined by test assemblies 100*e* and 100*f* wherein test assemblies 100*e* and 100*f* have at least one sensor that is configured and disposed wherein the plunger 80 is not in contact with the one or more sensors when combination solenoid coil and plunger assembly 8 is in the pre-test configuration 1005*a*, and wherein the plunger 80 is not in contact with the one or more sensors when the combination solenoid coil and plunger assembly 8 is in the post-test configuration 1005*b*.

Figure 16:
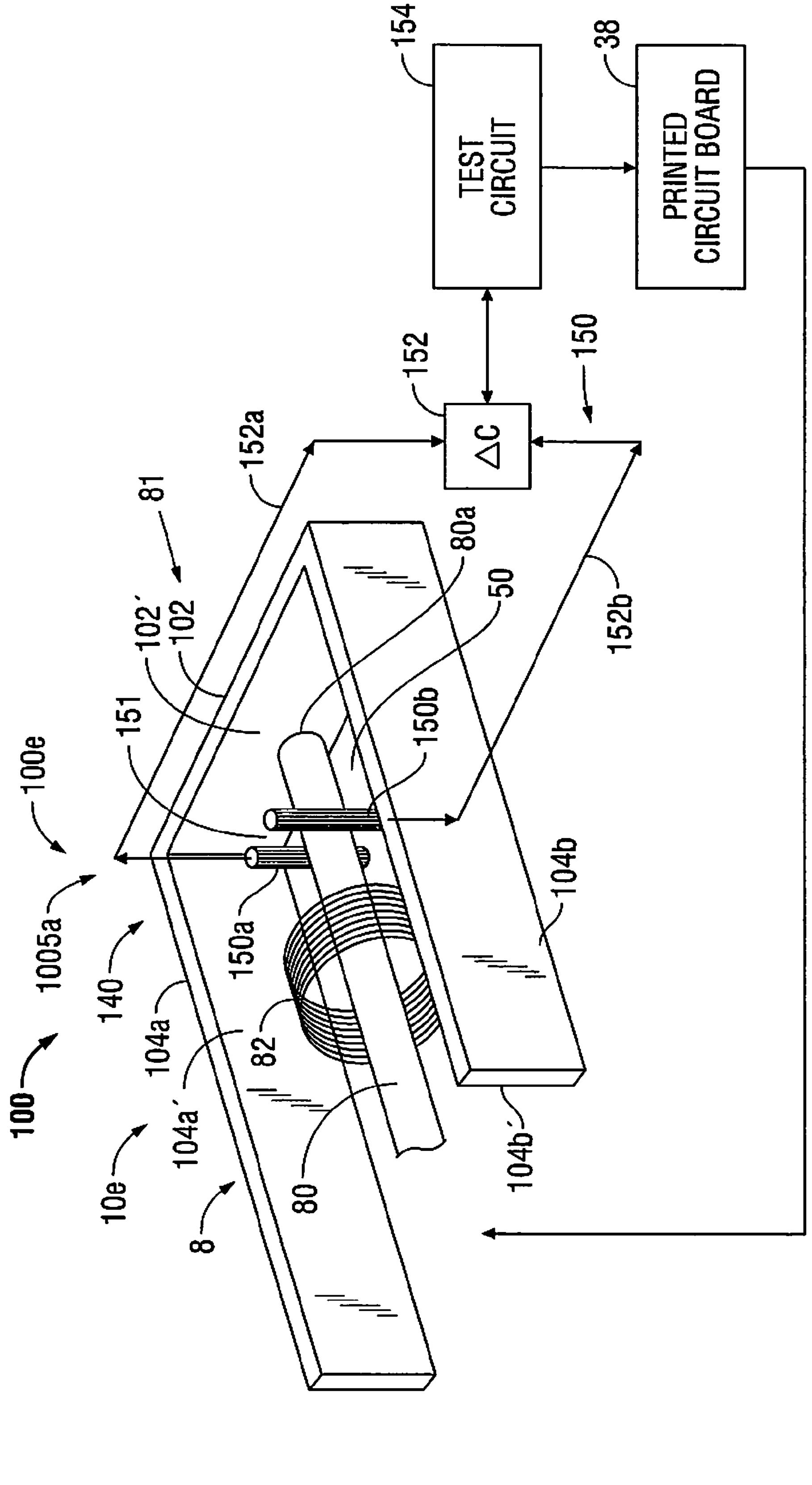
FIG. 16 is a perspective view of one embodiment of a part of a GFCI device that is configured with conductive members providing capacitance to detect and sense solenoid plunger movement according to the present disclosure.

More particularly, referring to FIG. 16, test assembly 100*e* of GFCI device 100*e* includes as at least one sensor and correspondingly as at least one electrical element a first conductive member 150*a* and a second conductive member 150*b*. The first and second conductive members 150*a* and 150*b* are configured in the exemplary embodiment of FIG. 16 as a pair of cylindrically shaped pins within the cavity 50 and disposed in a parallel configuration with respect to each other to form a space or region 151 there between. (Those skilled in the art will recognize that first and second conductive members 150*a* and 150*b* correspond to first and second sensors 1010*a* and 1010*b* in FIGS. 14 and 15). A capacitance meter 152 is electrically coupled to the first and second conductive members 150*a* and 150*b* via first and second connectors/connector terminals 152*a* and 152*b*, respectively, to form a circuit 150. The first conductive member 150*a* is electrically coupled to the first connector/connector terminal 152*a* while the second conductive member 150*b* is electrically coupled to the second connector/connector terminal 152*b*. The conductive members 150*a* and 150*b* have an initial charge providing a capacitance value or load C'.

The combination solenoid coil and plunger assembly 8 is disposed on the printed circuit board 38 with respect to the conductive members 150*a* and 150*b* so that the plunger 80 is disposed in the region 151 between the conductive members 150*a* and 150*b*. The GFCI device 10*e* again further includes a test initiation circuit and a test sensing circuit, which are illustrated schematically as a combined self-test initiation and test sensing circuit 154, although the test initiation features and the sensing features can be implemented by separate circuits again as described above. The capacitance meter 152 is also electrically coupled to the sensing features of the circuit 154.

When the plunger 80 is in a position indicative of the pre-test configuration 1005*a* of the GFCI device 10*e*, the plunger 80 is not in contact with the first and second conductive members 150*a* and 150*b*, respectively, and is in a position with respect to the first and second conductive members 150*a* and 150*b*, respectively, that is indicative of a first capacitance value C1' that differs from capacitance value C' by a predetermined value due to the presence of the plunger 80 in the region 151. The predetermined value may be defined as a predetermined range of values that are more than, equal to, or less than the predetermined value. In the example illustrated in FIG. 16, the plunger 80 is illustrated between the first and second conductive members 150*a* and 150*b*, respectively, when the plunger 80 is in a position indicative of the pre-test configuration 1005*a* of the GFCI device 10*e*.

Conversely, when the plunger 80 is in a position indicative of the post-test configuration 1005*b* of the GFCI device 10*e*, the plunger 80 is again not in contact with the first and second conductive members 150*a* and 150*b*, respectively, and additionally the plunger 80 is in a position with respect to, e.g., that is not between, the conductive members 150*a* and 150*b* (corresponding to first and second sensors 1010*a* and 1010*b* in FIG. 15) and that is indicative of a second capacitance value C2' that differs from both capacitance C' and C1' due to the absence of the plunger 80 in the region 151. The value of the capacitance C2' returns to the value of the capacitance C1' when the plunger 80 returns to the pre-test configuration 1005*a*, within a tolerance range of values that may be experimentally or analytically predetermined depending upon the particular physical characteristics of the GFCI device 100*e* and the materials from which it is constructed. Again, the predetermined value may be defined as a predetermined range of values that are more than, equal to, or less than the predetermined value.

In the event of a successful test of the combination solenoid coil and plunger assembly 8, the test initiation feature of the circuit 154 causes at least partial movement of the plunger 80 in the test direction 83' that is in the same direction as the forward or fault direction as indicated by arrow 81 so as to move the plunger 80 out of the region 151 between conductive members 150*a* and 150*b*, thereby changing the capacitance sensed by the capacitance meter 152 from C1' to C2'. The difference between the second capacitance value C2' and the first capacitance value C1' that is indicative of movement of the plunger 80 is a predetermined value, wherein the predetermined value may be a predetermined range of values that is more than, equal to, or less than the predetermined value, that is also experimentally determined and is dependent upon the particular physical characteristics of the GFCI device 100*e* and the materials from which it is constructed.

Conversely, in the event of an unsuccessful test of the combination solenoid coil and plunger assembly 8, the test initiation feature of the circuit 154 causes no or insufficient movement of the plunger 80 so that capacitance sensed by the capacitance meter 152 remains at or nearly equal to C2' in the circuit 150. In one embodiment, the test sensing feature of the circuit 154 is similarly electrically coupled to a microprocessor (not shown) residing on the printed circuit board 38 that annunciates, or trips the GFCI device 10*b*, in the event of failure of the self-test.

When the plunger 80 returns to the pre-test configuration 1005*a* following the post-test configuration 1005*b*, the plunger 80 returns substantially to its original position in the region 151 to again produce a capacitance value substantially of C1' in the circuit 150. The connectors/connector terminals 152*a* and 152*b* connected to the conductive members 150*a* and 150*b* enable measurement of the capacitance of the conductive members 150*a* and 150*b* by the capacitance meter 152.

In a similar manner as described above, those skilled in the art will recognize that GFCI device 10*e* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*e* includes members, e.g., the test initiation and sensing circuit 154 and the test assembly 100*e*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Referring now to FIG. 17, and again in view of FIGS. 14 and 15, test assembly 100*f* of GFCI device 10*f* includes an optical emitter 160*a* and as at least one sensor an optical sensor 160*b*, e.g., an infrared sensor, that is disposed within the GFCI device 10*f* to receive light, e.g., infrared (IR) light, and particularly a light beam emitted from an optical emitter 160*a*, e.g., an infrared emitter. Those skilled in the art will recognize that although optical emitter 160*a* is not functioning herein as a sensor, for the purposes of the discussion herein, optical emitter 160*a* and optical sensor 160*b* are assumed to correspond to the first sensor 1010*a* and second sensor 1010*b* in FIGS. 14 and 15, respectively. The optical sensor 160*b* may be an electrical element, or a non-electrical element such as a purely photonic element.

Figure 17:
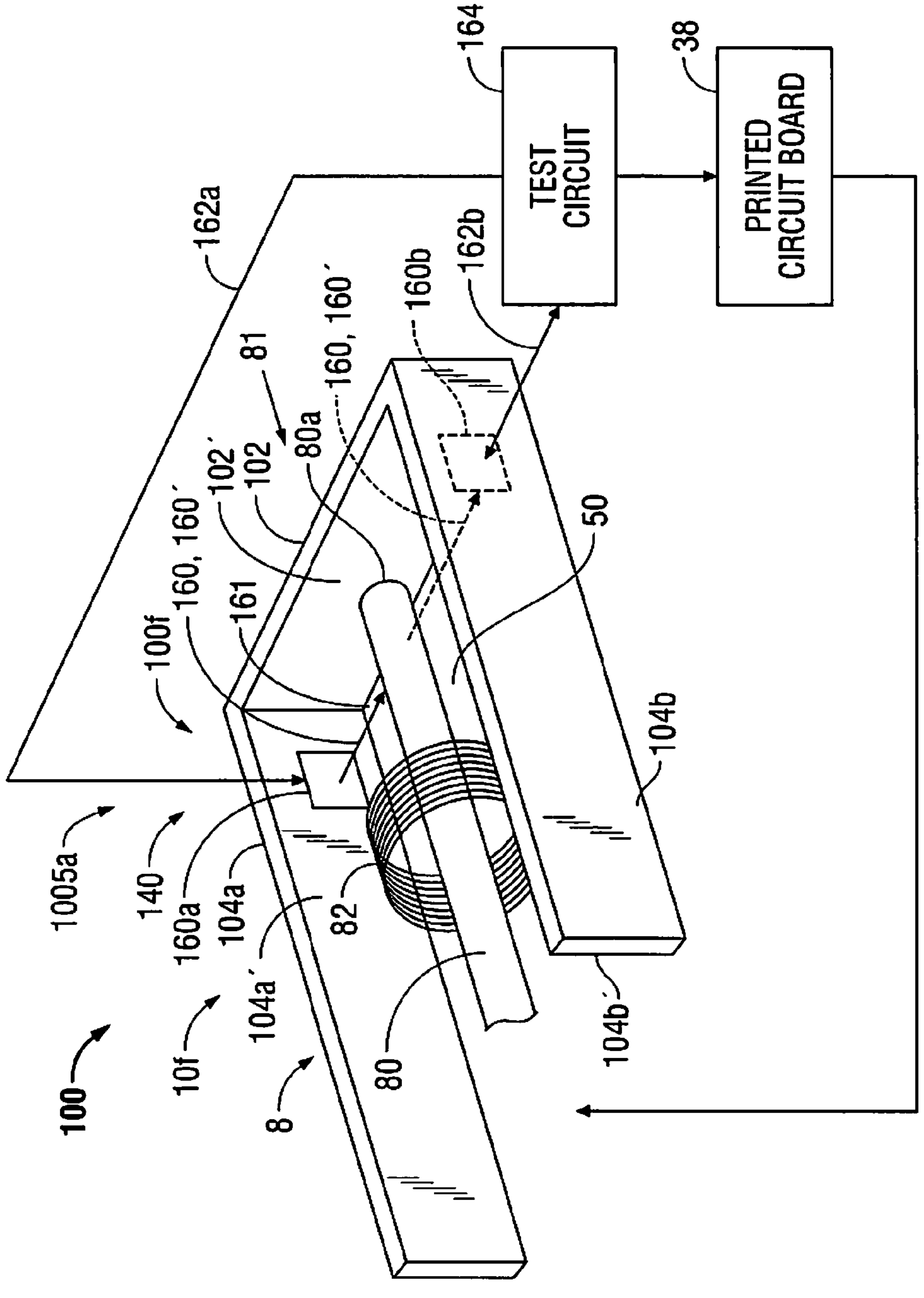
FIG. 17 is a perspective view of one embodiment of a part of a GFCI device that is configured with an optical emitter and an optical sensor to detect and sense solenoid plunger movement according to the present disclosure.

The optical emitter 160*a* and the optical sensor 160*b* are configured in the exemplary embodiment of FIG. 17 as a pair of plate-like films disposed respectively on the surfaces 104*a*' and 104*b*' of the first and second lateral support members 104*a* and 104*b*, respectively, in an interfacing parallel configuration with respect to each other to form a space or region 161 there between and so as to enable the optical emitter 160*a* to emit light beam 160 in a path 160' from the emitter 160*a* to the sensor 160*b*.

The test assembly 100*f* of GFCI device 10*f* again further includes a test initiation circuit and a test sensing circuit, which are illustrated schematically as a combined self-test initiation and sensing circuit 164, although again the test initiation features and the sensing features can be implemented by separate circuits as described above. The test initiation feature of the circuit 164 is electrically coupled to the infrared emitter 160*a* while the sensing feature of the circuit 164 is electrically coupled to the infrared sensor 160*b*. The combination solenoid coil and plunger assembly 8 is disposed on the printed circuit board 38 and configured so that, when the plunger 80 is in a position indicative of the pre-test configuration 1005*a*, the plunger 80 interrupts the path 160' of the light beam 160 emitted from the optical emitter 160*a*. In one embodiment, the light 160 is emitted from the emitter 160*a* only when initiated by the test initiation feature of the circuit 164.

Conversely, when the plunger 80 transfers to the post-test configuration 1005*b* to move away from the position indicative of the pre-test configuration 1005*a*, e.g., such as by at least partial movement of the plunger 80 in the test direction 83' that is in the same direction as the forward or fault direction as indicated by arrow 81 to move out of the path 160' of the light beam 160, the movement of the plunger 80 enables the light beam 160 to propagate in a path, i.e., path 160', e.g., a continuous or direct path, from the optical emitter 160*a* to the optical sensor 160*b*. Thus, measurement via the optical sensor 160*b* of the continuity of the path 160' of the light beam 160' is indicative of movement of the plunger 80.

In a similar manner as described above for the GFCI devices 10*a* to 10*e*, in the event of a successful test of the combination solenoid coil and plunger assembly 8, a signal by the test initiation feature of the circuit 164 initiates emission of the light beam 160 and causes at least partial movement of the plunger 80 in the test direction 83' that is in the same direction as the forward or fault direction as indicated by arrow 81 so as to move the plunger 80 out of the path 160' to provide continuity of the path 160' from the emitter 160*a* to the sensor 160*b*.

Conversely, in the event of an unsuccessful test of the combination solenoid coil and plunger assembly 8, a signal by the test initiation feature of the circuit 164 causes no or insufficient movement of the plunger 80 so that the plunger 80 remains in the path 160' of the light beam 160. Since the plunger 80 is illustrated in FIG. 17 as interrupting the light beam 160, i.e., remaining in the path 160', the light beam 160 is shown as a dashed line. When the plunger 80 returns to the pre-test configuration 1005*a* following the post-test configuration 1005*b*, the plunger 80 returns substantially to its original position so as to interrupt the path 160' to enable verification of the plunger 80 being again in the proper position indicative of the pre-test configuration 1005*a* so that the plunger 80 again interrupts the path 160' of the light beam 160 emitted from the optical emitter 160*a*.

Those skilled in the art will recognize that the optical emitter 160*a* and the optical sensor 160*b* may be configured with respect to the plunger 80 wherein when the plunger 80 is in a position indicative of the pre-test configuration 1005*a*, the light beam 160 propagates in a path 160", e.g., a continuous or direct path, from the optical emitter 160*a* to the optical sensor 160*b* (corresponding to first and second sensors 1010'*a* and 1010'*b*, respectively, in FIGS. 14 and 15). Upon the plunger 80 transferring to the post-test configuration 1005*b* to move away, in the test direction 83' that is in the same direction as the fault direction 81, from the position indicative of the pre-test configuration 1005*a*, the movement of the plunger 80 enables the plunger 80 to at least partially interrupt the path 160' of the light beam 160 emitted from the optical emitter 160*a* to the optical sensor 160*b*. In this embodiment, measurement via the optical sensor 160*b* of discontinuity of the path 160' of the light beam 160 is indicative of movement of the plunger 80. Measurement via the optical sensor 160*b* of continuity of the path 160' of the light beam 160 following a test initiation signal is indicative of no or insufficient movement of the plunger 80.

Those skilled in the art will recognize also that the optical emitter 160*a* and the optical sensor 160*b* may be configured with respect to the plunger 80 in a pre-test configuration that is identical to the post-test configuration 1005*b* illustrated in FIG. 15 and such that the plunger 80 transfers from the pre-test configuration to a post-test configuration that is identical to the pre-test configuration 1005*a* illustrated in FIG. 14 by at least partial movement of the plunger 80 in the test direction 83 that is opposite to the fault direction 81 so that the plunger 80 interrupts the path 160' of the light beam 160 emitted from the optical emitter 160*a*. Those skilled in the art will recognize also that measurement via the optical sensor 160*b* of discontinuity of the path 160' of the light beam 160 is indicative of movement of the plunger 80 and that measurement via the optical sensor 160*b* of continuity of the path 160' of the light beam 160 following a test initiation signal is indicative of no or insufficient movement of the plunger 80.

Again, in a similar manner as described above, those skilled in the art will recognize that GFCI device 10*f* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*f* includes members, e.g., the test initiation and sensing circuit 164 and the test assembly 100*f*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Those skilled in the art will recognize that although the test assembly 100, includes a test initiation circuit that is configured to initiate and conduct an at least partial operability test of the circuit interrupter, e.g., GFCI device 10, and a test sensing circuit that is configured to sense a result of the at least partial operability test of the circuit interrupter or GFCI device 10, has been illustrated in FIGS. 10-13 and 16-17 to be disposed at one particular location within the GFCI device 10 with respect to the combination coil and plunger assembly 8, the test assembly 100 may be disposed at other suitable locations within the GFCI device 10 or otherwise suitably dispersed or suitably integrated within the GFCI device 10 to perform the intended function of self initiating and conducting an at least partial operability test of the GFCI device 10.

As can be appreciated from the aforementioned disclosure, referring to FIGS. 1-17, the present disclosure relates also to a corresponding method of testing a circuit interrupting device, e.g., GFCI device 10, that includes the steps of generating an actuation signal, e.g., such as an actuation signal generated by test initiation and sensing circuit 114 in FIG. 10, test initiation and sensing circuit 124 in FIG. 11, test initiation and sensing circuit 134 in FIG. 12, test initiation and sensing circuit 144 in FIG. 13; test initiation and sensing circuit 154 in FIG. 16, and test initiation and sensing circuit 164 in FIG. 17; and causing a plunger, e.g., plunger 80, to move in response to the actuation signal, without causing the circuit interrupting device, e.g., GFCI device 10, to trip.

The method also includes measuring the movement of the plunger 80, e.g., measuring via piezoelectric member 110 in FIG. 10, or resistive member 120 in FIG. 11, or capacitive member 130 in FIG. 12, or conductive members 140*a* and 140*b* in FIG. 13, or conductive pins 150*a* and 150*b* in FIG. 16, or optical emitter 160*a* and optical sensor 160*b* in FIG. 17; and determining whether the movement reflects an operable circuit interrupting device, e.g., whether movement of the plunger 80 is indicative of sufficient movement of the plunger 80 during a required real transfer of the circuit interrupting device, e.g. GFCI device 10, from a non-actuated configuration to an actuated configuration.

The step of causing the plunger 80 to move in response to the actuation signal may be performed by causing the plunger 80 to move in a test direction that is in the same direction as the fault direction, e.g., test direction 83' that is in the same direction as the fault direction 81. Alternatively, the step of causing the plunger 80 to move in response to the actuation signal may be performed by causing the plunger 80 to move in a test direction that is in a direction different from the fault direction, e.g., test direction 83 that is in a direction different from the fault direction 81, including a direction that is opposite to the fault direction 81.

The method of testing the GFCI device 10, wherein when the GFCI device 10*a* is in a pre-test configuration, e.g., pre-test configuration 1002*a* described above with respect to FIG. 8, at least one piezoelectric member, e.g., piezoelectric pad or sensor 110 described above with respect to FIG. 10 produces substantially no voltage when the plunger 80 is in substantially stationary contact with the piezoelectric member 110 or when the plunger 80 is not in contact with the piezoelectric member, may be implemented wherein the step of causing the plunger 80 to move in response to the actuation signal may be performed by causing the plunger 80 to dynamically contact the at least one piezoelectric pad or sensor 110 to produce a voltage output.

The step of determining whether the movement reflects an operable circuit interrupting device may be performed by determining whether the voltage output is indicative of movement of the plunger 80 that is indicative of sufficient movement of the plunger 80 during a required real transfer of the circuit interrupting device, e.g., GFCI device 10*a*, from a non-actuated configuration to an actuated configuration, or alternatively is indicative of no or insufficient movement of the plunger 80 during a required real transfer of the circuit interrupting device, e.g., GFCI device 10*a*, from a non-actuated configuration to an actuated configuration. (As defined herein, a step of determining can also be determined by whether an action occurs).

In one embodiment of the method of testing a circuit interrupting device, the circuit interrupting device, e.g., GFCI device 10, includes at least one electrical element, e.g., resistive member 120 in FIG. 11 for GFCI device 10*b*, or capacitive member 130 in FIG. 12 for GFCI device 10*c*, that is characterized by an impedance value. The step of measuring the movement of the plunger 80 is performed by measuring an electrical property, e.g., a first impedance value, of the at least one electrical element that is characteristic of when the plunger 80 is in contact with the at least one electrical element, e.g., measuring resistance R1 of resistive member 120 or capacitance value C1 of capacitive member 130; measuring the electrical property, e.g., a second impedance value, of the at least one electrical element that is characteristic of when the plunger 80 is not in contact with the at least one electrical element, e.g., measuring resistance R2 of resistive member 120 or capacitance value C2 of capacitive member 130; and measuring the difference between the first electrical property and the second electrical property, e.g., R2 minus R1 or C2 minus C1, or differences in impedance values.

The step of determining whether the movement of the plunger 80 reflects an operable circuit interrupting device may be performed by determining whether the difference between the first electrical property and the second electrical property is indicative of sufficient movement of the plunger 80 during a required real transfer of the circuit interrupting device, e.g., GFCI device 10, from a non-actuated configuration to an actuated configuration, or alternatively, is indicative of no or insufficient movement of the plunger 80 during a required real transfer of the circuit interrupting device, e.g., GFCI device 10, from a non-actuated configuration to an actuated configuration.

In another embodiment of the method of testing a circuit interrupting device, the circuit interrupting device, e.g., GFCI device 10*d* of FIG. 13, includes first and second electrically conductive members, e.g., first and second electrically conductive members 140*a* and 140*b*, respectively, as described above with respect to FIG. 13 that may be conductive tape strips or similarly configured material, of test assembly 100*d*, that are electrically isolated from one another and with respect to the coil and plunger assembly 8 such that the plunger 80 makes electrical contact with both the first and second conductive members 140*a* and 140*b*, respectively, to form a continuous conductive path. The step of measuring the movement of the plunger 80 is performed by measuring electrical continuity of the conductive path following the step of causing the plunger 80 to move in response to the actuation signal.

When the circuit interrupting device, e.g., GFCI device 10*d*, transfers from pre-test configuration 1002*a* to post-test configuration 1002*b*, as per FIGS. 8 and 9, respectively, the step of determining whether the movement reflects an operable circuit interrupting device is performed by determining whether the plunger 80 moves away from at least one of the first and second conductive members, 140*a* and 140*b*, respectively, wherein termination of the continuity of the conductive path is indicative of sufficient movement of the plunger 80 during a required real transfer of the circuit interrupting device, e.g., GFCI device 10*d*, from a non-actuated configuration to an actuated configuration. Alternatively, continued electrical continuity of the conductive path is indicative of no or insufficient movement of the plunger 80 during a required real transfer of the circuit interrupting device, e.g., GFCI device 10*d*, from the non-actuated configuration to the actuated configuration.

In an alternate embodiment of the method of testing a circuit interrupting device, when the circuit interrupting device, e.g., a GFCI device analogous to GFCI device 10*d* illustrated in FIG. 13, transfers from pre-test configuration 1001*a* to post-test configuration 1001*b*, as illustrated in FIGS. 6 and 7, respectively, the step of determining whether the movement reflects an operable circuit interrupting device is performed by determining whether the plunger 80 moves towards at least one of the first and second conductive members 140*a* and 140*b*, respectively, wherein establishment of continuity of the conductive path is indicative of sufficient movement of the plunger 80 during a required real transfer of the circuit interrupting device from a non-actuated configuration to an actuated configuration. Discontinuity of the conductive path is indicative of insufficient movement of the plunger 80 during a required real transfer of the circuit interrupting device from the non-actuated configuration to the actuated configuration. (As defined herein, the step of determining can also be determined by whether the plunger 80 moves).

In still another embodiment of the method of testing a circuit interrupting device, the circuit interrupting device, e.g., GFCI device 10*e* illustrated in FIG. 16, includes first conductive member 150*a* and second conductive member 150*b*, and wherein, when the circuit interrupting device, e.g., GFCI device 10*e*, is in one of pre-test configuration 1005*a* and post-test configuration 1005*b* as illustrated in FIGS. 14 and 15, respectively, the plunger 80 is in a position with respect to, and may include being between, the first and second conductive members 150*a* and 150*b*, respectively, that is indicative of one of corresponding pre-test capacitance value C1' and corresponding post-test capacitance value C2', respectively. The step of measuring movement of the plunger 80 is performed by measuring the pre-test capacitance value C1' and the post-test capacitance value C2'.

The step of determining whether the movement reflects an operable circuit interrupting device is performed by determining if the post-test capacitance value C2' differs from the pre-test capacitance value C1' by a predetermined value that is indicative of sufficient movement of the plunger 80 during a required real transfer of the circuit interrupting device, e.g., GFCI device 10*e*, from a non-actuated configuration to an actuated configuration, or alternatively, is indicative of no or insufficient movement of the plunger 80 during a required real transfer of the circuit interrupting device, e.g., GFCI device 10*e*, from a non-actuated configuration to an actuated configuration.

In yet another embodiment of the method of testing a circuit interrupting device, the circuit interrupting device, e.g., GFCI device 10*f* illustrated in FIG. 17, further includes an optical emitter, e.g., optical emitter 160*a* (corresponding to sensor 1010*a* in FIG. 14), emitting a light beam, e.g., light beam 160, in a path therefrom, e.g., path 160' as illustrated in FIGS. 14, 15 and 17. The step of measuring movement of plunger 80 is performed by measuring whether the plunger 80 at least partially interrupts the path 160' of the light beam 160 emitted from the optical emitter 160*a*. The step of causing the plunger 80 to move in response to the actuation signal is performed wherein movement of the plunger 80 enables the light beam 160 to propagate in a continuous path from the optical emitter 160*a* to an optical sensor, e.g., optical sensor 160*b*. The step of determining whether the movement reflects an operable circuit interrupting device may be performed by measuring continuity of the path 160' of the light beam 160 wherein the continuity of the light path 160' is indicative of sufficient movement of the plunger 80 during a required real transfer of the circuit interrupting device, e.g., GFCI device 10*f*, from the non-actuated configuration to the actuated configuration. Alternatively, measuring discontinuity of the path 160' of the light beam 160 is indicative of no or insufficient movement of the plunger 80 during a required real transfer of the circuit interrupting device, e.g., GFCI device 10*f*, from the non-actuated configuration to the actuated configuration.

In still another embodiment of the method of testing a circuit interrupting device, the circuit interrupting device includes optical emitter 160*a* (corresponding to sensor 1010'*a* in FIG. 14) emitting light beam 160 in a path there from, e.g., light path 160" in FIG. 14. The step of measuring movement of the plunger 80 is performed by measuring whether the light beam 160 propagates in a continuous path 160" from the optical emitter, e.g., optical emitter 160*a* (corresponding to sensor 1010'*a* in FIG. 14) to an optical sensor, e.g., optical sensor 160*b* (corresponding to sensor 1010'*b* in FIG. 14). The step of causing the plunger 80 to move in response to the actuation signal is performed wherein movement of the plunger 80 enables the plunger 80 to at least partially interrupt the continuous path 160" of the light beam 160 emitted from the optical emitter 160*a*.

The step of determining whether the movement reflects an operable circuit interrupting device is performed by measuring discontinuity of the path 160" of the light beam 160 wherein the discontinuity of the path 160" of the light beam 160 is indicative of sufficient movement of the plunger 80 during a required real transfer of the circuit interrupting device, e.g., GFCI device 10*f*, from the non-actuated configuration to the actuated configuration. Alternatively, measuring continuity of the path 160" of the light beam 160 is indicative of no or insufficient movement of the plunger 80 during a required real transfer of the circuit interrupting device, e.g., GFCI device 10*f*, from the non-actuated configuration to the actuated configuration.

The foregoing different embodiments of a circuit interrupting device according to the present disclosure are configured with mechanical components that break one or more conductive paths to cause the electrical discontinuity. However, the foregoing different embodiments of a circuit interrupting device may also be configured with electrical circuitry and/or electromechanical components to break either the phase or neutral conductive path or both paths. That is, although the components used during circuit interrupting and device reset operations are electromechanical in nature, electrical components, such as solid state switches and supporting circuitry, as well as other types of components capable or making and breaking electrical continuity in the conductive path may also be used.

Those skilled in the art will recognize that the test initiation and sensing circuits may also be programmed to return the plunger from the post-test configuration back to the pre-test configuration once the test measurements of plunger movement have been performed.

Further, those skilled in the art will recognize that although the foregoing description has been directed specifically to a ground fault circuit interrupting device, as discussed above, the disclosure may also relate to other circuit interrupting devices, including arc fault circuit interrupting (AFCI) devices, immersion detection circuit interrupting (IDCI) devices, appliance leakage circuit interrupting (ALCI) devices, circuit breakers, contactors, latching relays, and solenoid mechanisms.

Although the present disclosure has been described in accordance with the embodiments shown, one of ordinary skill in the art will readily recognize that there could be variations to the embodiment and these variations would be within the spirit and scope of the present disclosure. Accordingly, many modifications may be made by one of ordinary skill in the art without departing from the spirit and scope of the appended claims.

What is claimed is:

1. A circuit interrupting device configured to cause electrical discontinuity along a conductive path upon the occurrence of a predetermined condition, comprising:

a fault sensing circuit configured to detect the predetermined condition and to generate a circuit interrupting actuation signal; and a coil and plunger assembly, having at least one coil and a plunger actuatable by the circuit interrupting actuation signal and configured and disposed within the circuit interrupting device so that upon detection of the occurrence of the predetermined condition the plunger will move in a fault direction from a non-actuated configuration to an actuated configuration a distance sufficient to cause disengagement of at least one set of contacts from each other and thereby cause electrical discontinuity along the conductive path; and a test assembly configured to cause the plunger to move in a test direction, from a pre-test configuration to a post-test configuration, a distance insufficient to disengage the at least one set of contacts from each other.

2. The circuit interrupting device according to claim 1, wherein the test direction of the plunger is in the same direction as the fault direction.

3. The circuit interrupting device according to claim 1, wherein the test direction of the plunger is in a direction different from the fault direction.

4. The circuit interrupting device according to claim 3, wherein the test direction of the plunger is in a direction opposite to the fault direction.

5. The circuit interrupting device according to claim 1, further comprising:

at least one sensor disposed to detect a change in plunger position from the pre-test configuration to the post-test configuration.

6. The circuit interrupting device according to claim 5, wherein the test assembly comprises:

a test initiation circuit configured to initiate and conduct a test of the circuit interrupting device that includes initiating movement of the plunger from the pre-test configuration to the post-test configuration; and a test sensing circuit in electrical communication with the at least one sensor and configured to sense a result of the test of the circuit interrupting device.

7. The circuit interrupting device according to claim 5, wherein, when the circuit interrupting device is in the pre-test configuration, the plunger is not in contact with the at least one sensor, and when the circuit interrupting device is in the post-test configuration, the plunger is in contact with the at least one sensor.

8. The circuit interrupting device according to claim 5, wherein, when the circuit interrupting device is in the pre-test configuration, the plunger is in contact with the at least one sensor, and when the circuit interrupting device is in the post-test configuration, the plunger is not in contact with the at least one sensor.

9. The circuit interrupting device according to claim 5, wherein the at least one sensor comprises at least one electrical element.

10. The circuit interrupting device according to claim 9, wherein the at least one electrical element comprises:

a piezoelectric member, wherein, when the circuit interrupting device is in the pre-test configuration, the piezoelectric member produces substantially no voltage when the plunger is one of (a) in substantially stationary contact with the at least one electrical element, and (b) not in contact with the at least one electrical element.

11. The circuit interrupting device according to claim 10, wherein, when the circuit interrupting device is in the post-test configuration, the piezoelectric member produces a voltage output when the plunger dynamically contacts the at least one electrical element.

12. The circuit interrupting device according to claim 11, wherein the voltage output is of a magnitude pre-determined to be indicative of movement of the plunger that is a pre-cursor to one of (a) sufficient movement and (b) insufficient movement of the plunger during a required real transfer of the circuit interrupting device from the non-actuated configuration to the actuated configuration.

13. The circuit interrupting device according to claim 12, wherein a voltage output of substantially zero by the piezoelectric member is indicative of insufficient movement of the plunger during a required real transfer of the circuit interrupting device from the non-actuated configuration to the actuated configuration.

14. The circuit interrupting device according to claim 9, wherein the at least one electrical element is characterized by an impedance value, the at least one electrical element is disposed such that when the plunger is in contact with the electrical element, a first impedance value is produced by the at least one electrical element, and when the plunger is not in contact with the at least one electrical element, a second impedance value is produced by the at least one electrical element.

15. The circuit interrupting device according to claim 9, wherein the at least one electrical element is characterized by an impedance value, the at least one electrical element is disposed such that when the plunger is in the proximity of the electrical element, a first impedance value is produced by the at least one electrical element, and when the plunger is not in the proximity of the at least one electrical element, a second impedance value is produced by the at least one electrical element.

16. The circuit interrupting device according to claim 14, wherein the at least one electrical element characterized by an impedance value is at least one of a resistor and a capacitor.

17. The circuit interrupting device according to claim 15, wherein the at least one electrical element characterized by an impedance value is an inductor.

18. The circuit interrupting device according to claim 14, wherein when the circuit interrupting device transfers to one of (a) the pre-test configuration from the post-test configuration, and (b) the post-test configuration from the pre-test configuration, a difference between the first impedance value and the second impedance value is indicative of sufficient movement of the plunger during a required real transfer of the circuit interrupting device from the non-actuated configuration to the actuated configuration.

19. The circuit interrupting device according to claim 14, wherein, when the circuit interrupting device transfers one to of (a) the pre-test configuration from the post-test configuration, and (b) the post-test configuration from the pre-test configuration, a second impedance value of the at least one electrical element that is substantially equal to the first impedance value is indicative of insufficient movement of the plunger during a required real transfer of the circuit interrupting device from the non-actuated configuration to the actuated configuration.

20. The circuit interrupting device according to claim 9, wherein the at least one electrical element comprises:

first and second electrically conductive members electrically isolated from one another and with respect to the coil and plunger assembly such that, when the circuit interrupting device transfers to one of (a) the pre-test configuration from the post-test configuration, and (b) the post-test configuration from the pre-test configuration, the plunger makes electrical contact with both the first and second conductive members to form a continuous conductive path.

21. The circuit interrupting device according to claim 20, wherein the circuit interrupting device is configured wherein upon the circuit interrupting device transferring from one of the pre-test configuration and the post-test configuration, the plunger moves away from at least one of the first and second conductive members.

22. The circuit interrupting device according to claim 21, wherein termination of the continuity of the conductive path is indicative of sufficient movement of the plunger during a required real transfer of the circuit interrupting device from the non-actuated configuration to the actuated configuration.

23. The circuit interrupting device according to claim 21, wherein continued electrical continuity of the conductive path is indicative of insufficient movement of the plunger during a required real transfer of the circuit interrupting device from the non-actuated configuration to the actuated configuration.

24. The circuit interrupting device according to claim 9, wherein the at least one electrical element comprises:

a first conductive member and a second conductive member, wherein, when the circuit interrupting device is in one of (a) the pre-test configuration, and (b) the post-test configuration, the plunger is in a position with respect to the first and second conductive members indicative of one of a corresponding pre-test capacitance value and a corresponding post-test capacitance value, respectively.

25. The circuit interrupting device according to claim 24, wherein, when the circuit interrupting device is in one of (a) the pre-test configuration, and (b) the post-test configuration, the plunger is in a position between the first and second conductive members indicative of one of the corresponding pre-test capacitance value and the corresponding post-test capacitance value, respectively.

26. The circuit interrupting device according to claim 24, wherein the circuit interrupting device is configured wherein movement of the plunger has occurred if the post-test capacitance value differs from the pre-test capacitance value by a predetermined range.

27. The circuit interrupting device according to claim 24, wherein the circuit interrupting device is configured wherein insufficient movement of the plunger has occurred if the post-test capacitance value differs from the pre-test capacitance value by a predetermined range.

28. The circuit interrupting device according to claim 5, further comprising:

an optical emitter emitting a light beam in a path therefrom, and wherein the at least one sensor is an optical sensor, the optical emitter and the optical sensor being configured with respect to the plunger wherein, when the circuit interrupting device is in one of (a) the pre-test configuration, and (b) the post-test configuration, the plunger at least partially interrupts the path of the light beam emitted from the optical emitter.

29. The circuit interrupting device according to claim 28, wherein, when the circuit interrupting device transfers from one of (a) the pre-test configuration to the post-test configuration and (b) the post-test configuration to the pre-test configuration, respectively, movement of the plunger enables the light beam to propagate from the optical emitter to the optical sensor.

30. The circuit interrupting device according to claim 29, wherein measurement by the optical sensor of the continuity of the path of the light beam is indicative of sufficient movement of the plunger during a required real transfer of the circuit interrupting device from the non-actuated configuration to the actuated configuration.

31. The circuit interrupting device according to claim 29, wherein measurement by the optical sensor of discontinuity of the path of the light beam is indicative of insufficient movement of the plunger during a required real transfer of the circuit interrupting device from the non-actuated configuration to the actuated configuration.

32. The circuit interrupting device according to claim 1, wherein the test assembly configured to enable a self test of the circuit interrupter via self testing at least partially movement of the plunger without causing electrical discontinuity along the conductive path.

33. The circuit interrupting device according to claim 1, wherein the circuit interrupting device is one of the group consisting of a (a) a ground fault circuit interrupting (GFCI) device; (b) an arc fault circuit interrupting (ACFI) device; (c) immersion detection circuit interrupting (IDCI) device; (d) appliance leakage circuit interrupting (ALCI) device; (e) circuit breaker; (f) contactor; (g) latching relay; and (h) solenoid mechanism.

34. A method of testing a circuit interrupting device comprising the steps of:

generating an actuation signal;

causing a plunger to move in response to said actuation signal, without causing said circuit interrupting device to trip;

measuring said movement of said plunger; and determining whether said movement reflects an operable circuit interrupting device.

35. The method of testing according to claim 34, wherein the plunger moves in a fault direction during operation of the circuit interrupting device, and wherein the step of causing the plunger to move in response to said actuation signal is performed by causing the plunger to move in a test direction.

36. The method of testing according to claim 35, wherein the test direction is in the same direction as the fault direction.

37. The method of testing according to claim 35, wherein the test direction is in a direction different from the fault direction.

38. The method of testing according to claim 37, wherein the test direction of the plunger is in a direction opposite to the fault direction.

39. The method of testing according to claim 34, wherein, when the circuit interrupting device is in a pre-test configuration, substantially no voltage is produced by at least one piezoelectric member when the plunger is one of (a) in substantially stationary contact with the at least one piezoelectric member, and (b) not in contact with the at least one piezoelectric member, wherein the step of causing the plunger to move in response to said actuation signal further comprises:

causing the plunger to dynamically contact the at least one piezoelectric member to produce a voltage output.

40. The method of testing according to claim 39, wherein the step of measuring said movement of said plunger is performed by measuring the voltage output of the at least one piezoelectric member.

41. The method of testing according to claim 40, wherein the step of measuring said movement of said plunger is performed by measuring the voltage output upon the plunger dynamically contacting the at least one piezoelectric member.

42. The method of testing according to claim 40, wherein the step of determining whether said movement reflects an operable circuit interrupting device is determined by whether said voltage output is indicative of sufficient movement of the plunger during a required real transfer of the circuit interrupting device from a non-actuated configuration to an actuated configuration.

43. The method of testing according to claim 40, wherein the step of determining whether said movement reflects an operable circuit interrupting device is determined by whether said voltage output is indicative of insufficient movement of the plunger during a required real transfer of the circuit interrupting device from a non-actuated configuration to an actuated configuration.

44. The method of testing according to claim 34, wherein the step of measuring said movement of said plunger further comprises:

measuring a first value of an electrical property of at least one electrical element that is characteristic of when the plunger is in contact with the at least one electrical element;

measuring a second value of the electrical property of the at least one electrical element that is characteristic of when the plunger is not in contact with the at least one electrical element; and measuring a difference between the first value of the electrical property and the second value of the electrical property.

45. The method of testing according to claim 34, wherein the step of measuring said movement of said plunger further comprises:

measuring a first value of an electrical property of at least one electrical element that is characteristic of when the plunger is in the proximity of the at least one electrical element;

measuring a second value of the electrical property of the at least one electrical element that is characteristic of when the plunger is not in the proximity of the at least one electrical element; and measuring a difference between the first value of the electrical property and the second value of the electrical property.

46. The method of testing according to claim 44, wherein the step of determining whether said movement of said plunger reflects an operable circuit interrupting device is determined by whether the difference between the first value of the electrical property and the second value of the electrical property is indicative of sufficient movement of the plunger during a required real transfer of the circuit interrupting device from a non-actuated configuration to an actuated configuration.

47. The method of testing according to claim 44, wherein the step of determining whether said movement of said plunger reflects an operable circuit interrupting device is determined by whether the difference between the first value of the electrical property and the second value of the electrical property is indicative of insufficient movement of the plunger during a required real transfer of the circuit interrupting device from a non-actuated configuration to an actuated configuration.

48. The method of testing according to claim 44, wherein the at least one electrical element characterized by an impedance load that is at least one of a resistor and a capacitor.

49. The method of testing according to claim 45, wherein the at least one electrical element is characterized by an impedance load that is an inductor.

50. The method of testing according to claim 34, wherein the circuit interrupting device includes first and second electrically conductive members electrically isolated from one another and with respect to the coil and plunger assembly such that the plunger makes electrical contact with both the first and second conductive members to form a continuous conductive path, wherein the step of measuring said movement of said plunger further comprises:

measuring electrical continuity of the conductive path following the step of causing the plunger to move in response to said actuation signal.

51. The method of testing according to claim 50, wherein the step of determining whether said movement reflects an operable circuit interrupting device is determined by, when the circuit interrupting device transfers to a post-test configuration from a pre-test configuration, determining whether the plunger moves away from at least one of the first and second conductive members, wherein termination of the continuity of the conductive path is indicative of sufficient movement of the plunger during a required real transfer of the circuit interrupting device from a non-actuated configuration to an actuated configuration.

52. The method of testing according to claim 51, wherein continued electrical continuity of the conductive path is indicative of insufficient movement of the plunger during a required real transfer of the circuit interrupting device from the non-actuated configuration to the actuated configuration.

53. The method of testing according to claim 50, wherein the step of determining whether said movement reflects an operable circuit interrupting device is determined by, when the circuit interrupting device transfers to a post-test configuration from a pre-test configuration, determining whether the plunger moves towards at least one of the first and second conductive members, wherein establishment of continuity of the conductive path is indicative of sufficient movement of the plunger during a required real transfer of the circuit interrupting device from a non-actuated configuration to an actuated configuration.

54. The method of testing according to claim 34, wherein the circuit interrupting device comprises:

a first conductive member and a second conductive member, wherein, when the circuit interrupting device is in one of a pre-test configuration and a post-test configuration, the plunger is in a position with respect to the first and second conductive members indicative of one of a corresponding pre-test capacitance value and a corresponding post-test capacitance value, respectively, wherein the step of measuring said movement of said plunger is performed by measuring the pre-test capacitance value and the post-test capacitance value.

55. The method of testing according to claim 54, wherein the step of determining whether said movement reflects an operable circuit interrupting device is performed by determining if the post-test capacitance value differs from the pre-test capacitance value by a predetermined value that is indicative of sufficient movement of the plunger during a required real transfer of the circuit interrupting device from a non-actuated configuration to an actuated configuration.

56. The method of testing according to claim 54, wherein the step of determining whether said movement reflects an operable circuit interrupting device is performed by determining if the post-test capacitance value differs from the pre-test capacitance value by a predetermined value that is indicative of no or insufficient movement of the plunger during a required real transfer of the circuit interrupting device from a non-actuated configuration to an actuated configuration.

57. The method of testing according to claim 54, wherein, when the circuit interrupting device is in one of the pre-test configuration and the post-test configuration, the plunger is in a position between the first and second conductive members indicative of one of the corresponding pre-test capacitance value and the corresponding post-test capacitance value, respectively.

58. The method of testing according to claim 34, wherein the circuit interrupting device further comprises:

an optical emitter emitting a light beam in a path therefrom, wherein the step of measuring said movement of said plunger is performed by measuring whether the plunger at least partially interrupts the path of the light beam emitted from the optical emitter.

59. The method of testing according to claim 58, wherein the step of causing the plunger to move in response to said actuation signal is performed wherein movement of the plunger enables the light beam to propagate in a path from the optical emitter to an optical sensor.

60. The method of testing according to claim 58, wherein the step of determining whether said movement reflects an operable circuit interrupting device is performed by measuring continuity of the path of the light beam wherein the continuity of the light path is indicative of sufficient movement of the plunger during a required real transfer of the circuit interrupting device from the non-actuated configuration to the actuated configuration.

61. The method of testing according to claim 58, wherein the step of determining whether said movement reflects an operable circuit interrupting device is performed by measuring discontinuity of the path of the light beam wherein discontinuity of the path of the light beam is indicative of insufficient movement of the plunger during a required real transfer of the circuit interrupting device from the non-actuated configuration to the actuated configuration.

62. The method of testing according to claim 34, wherein the circuit interrupting device includes an optical emitter emitting a light beam in a path therefrom, wherein the step of measuring said movement of said plunger further comprises:

measuring whether the light beam propagates in a path from the optical emitter.

63. The method of testing according to claim 62, wherein the step of causing the plunger to move in response to said actuation signal further comprises the plunger at least partially interrupting the path of the light beam emitted from the optical emitter.

64. The method of testing according to claim 62, wherein the step of determining whether said movement reflects an operable circuit interrupting device further comprises measuring discontinuity of the path of the light beam wherein the discontinuity of the path of the light beam is indicative of sufficient movement of the plunger during a required real transfer of the circuit interrupting device from the non-actuated configuration to the actuated configuration.

65. The method of testing according to claim 62, wherein the step of determining whether said movement reflects an operable circuit interrupting device is determined by measuring continuity of the path of the light beam wherein the continuity of the path of the light beam is indicative of insufficient movement of the plunger during a required real transfer of the circuit interrupting device from the non-actuated configuration to the actuated configuration.

* * * * *